July 21, 1964   E. A. IRLAND ET AL   3,142,039
REAL TIME READER FOR HAND-WRITTEN ALPHA NUMERIC CHARACTERS
Filed April 30, 1958   11 Sheets-Sheet 1

INVENTORS: E. A. IRLAND
C. G. MORRISON
BY Kenneth B Hamlin
ATTORNEY

FIG. 3

| ALPHA-NUMERIC CHARACTER | CRITERION AREA | | | | | | |
|---|---|---|---|---|---|---|---|
| | a | b | c | d | e | f | g |
| A, R | 1 | 1 | 1 | 1 | 1 | 1 | 0 |
| B, 8 | 1 | 1 | 1 | 1 | 1 | 1 | 1 |
| C | 1 | 1 | 0 | 0 | 1 | 0 | 1 |
| D, O, Q, ∅ | 1 | 1 | 1 | 0 | 1 | 1 | 1 |
| E | 1 | 1 | 0 | 1 | 1 | 0 | 1 |
| F | 1 | 1 | 0 | 1 | 1 | 0 | 0 |
| G | 1 | 1 | 0 | 1 | 1 | 1 | 1 |
| H, K, M, N, W, X | 1 | 0 | 1 | 1 | 1 | 1 | 0 |
| I, 1 | - | 0 | - | 0 | 1 | - | 0 |
| | - | 0 | - | 0 | - | 1 | 0 |
| J | 0 | - | 1 | 0 | - | 1 | 1 |
| L | 1 | 0 | 0 | 0 | 1 | 0 | 1 |
| P | 1 | 1 | 1 | 1 | 1 | 0 | 0 |
| S, 5 | 1 | 1 | 0 | 1 | 0 | 1 | 1 |
| T, 7 | - | 1 | - | 0 | - | - | 0 |
| U, V | 1 | 0 | 1 | 0 | 1 | 1 | 1 |
| Y, 4 | 1 | 0 | 1 | 1 | 0 | 1 | 0 |
| Y | 1 | 0 | 1 | 1 | 1 | 0 | 0 |
| | 1 | 0 | 1 | 1 | 1 | 0 | 1 |
| Z, 2 | 0 | 1 | 1 | 1 | 1 | 0 | 1 |
| 3 | 0 | 1 | 1 | 1 | 0 | 1 | 1 |
| 6 | 1 | - | 0 | 1 | 1 | 1 | 1 |
| 9 | 1 | 1 | 1 | 1 | 0 | 1 | 0 |

CODE:
1 = CRITERION AREA CROSSED
0 = CRITERION AREA NOT CROSSED
- = DON'T CARE

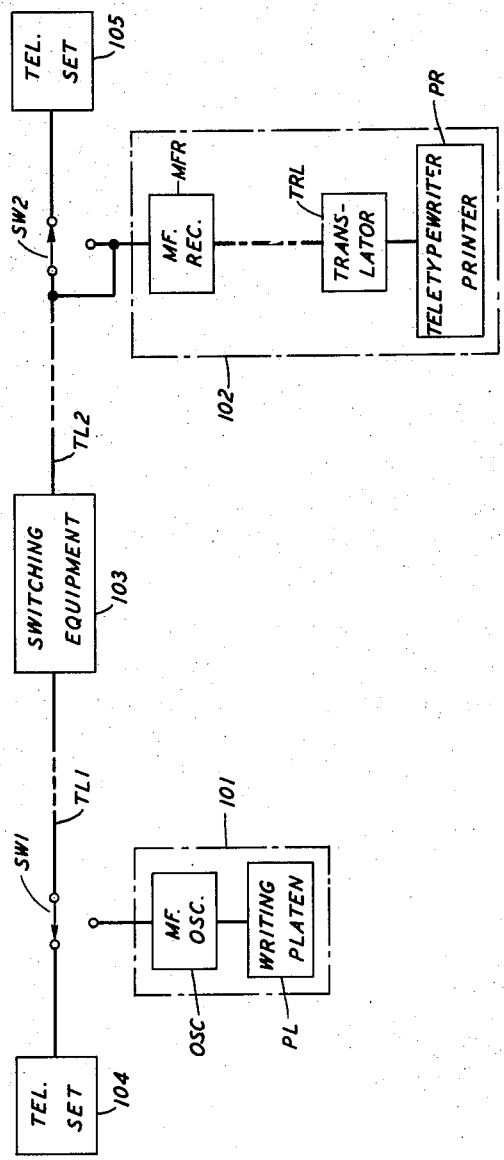
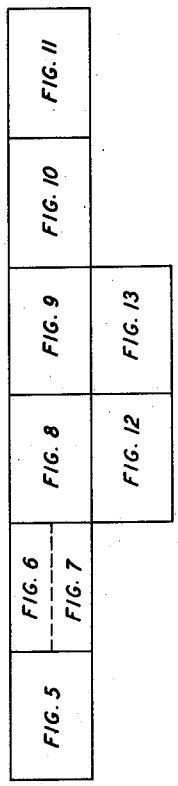

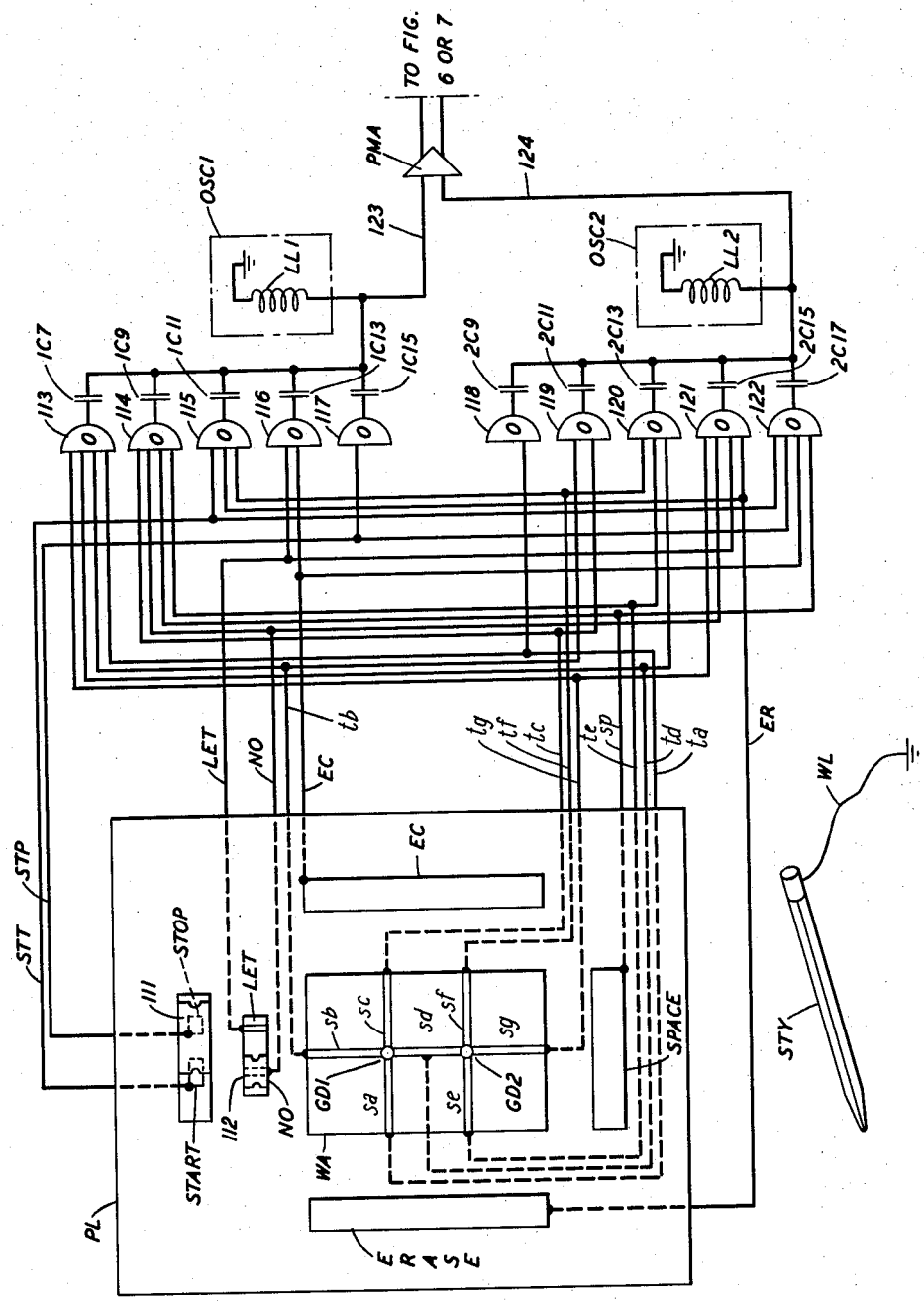

July 21, 1964 E. A. IRLAND ET AL 3,142,039
REAL TIME READER FOR HAND-WRITTEN ALPHA NUMERIC CHARACTERS
Filed April 30, 1958 11 Sheets-Sheet 5
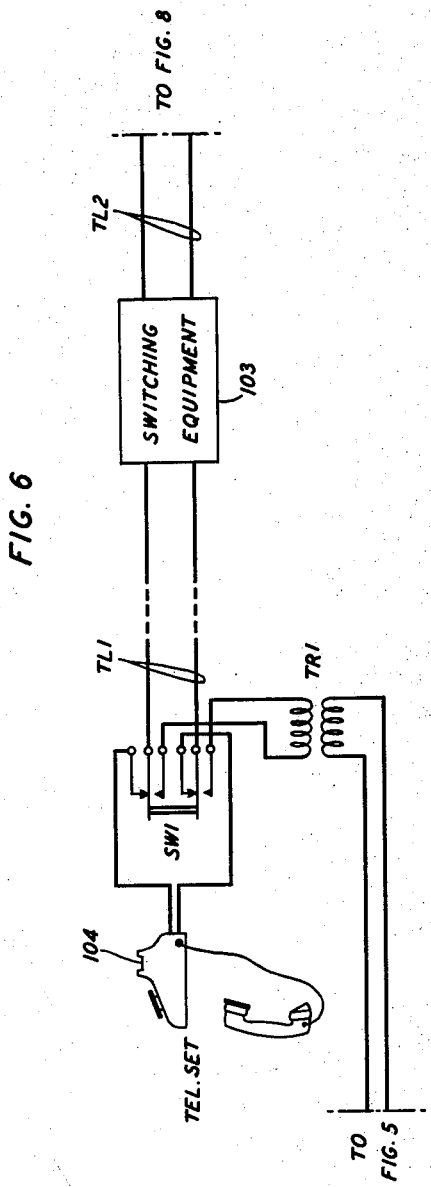
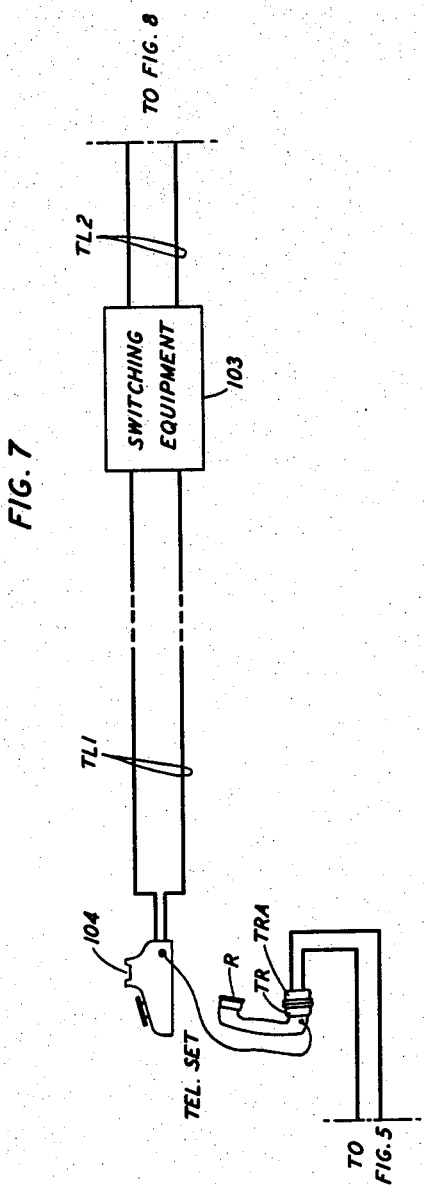
INVENTORS: E. A. IRLAND
C. G. MORRISON
BY
ATTORNEY July 21, 1964     E. A. IRLAND ET AL     3,142,039

REAL TIME READER FOR HAND-WRITTEN ALPHA NUMERIC CHARACTERS

Filed April 30, 1958     11 Sheets-Sheet 8

INVENTORS: E. A. IRLAND
C. G. MORRISON
BY
ATTORNEY

July 21, 1964  E. A. IRLAND ET AL  3,142,039
REAL TIME READER FOR HAND-WRITTEN ALPHA NUMERIC CHARACTERS
Filed April 30, 1958  11 Sheets-Sheet 10

FIG. 12

INVENTORS: E. A. IRLAND
C. G. MORRISON
BY Kenneth B Hamlin
ATTORNEY

United States Patent Office 3,142,039
Patented July 21, 1964

3,142,039
REAL TIME READER FOR HAND-WRITTEN ALPHA NUMERIC CHARACTERS
Edwin A. Irland, Hanover, and Charles G. Morrison, Livingston, N.J., assignors to Bell Telephone Laboratories, Incorporated, New York, N.Y., a corporation of New York
Filed Apr. 30, 1958, Ser. No. 731,937
18 Claims. (Cl. 340—146.3)

This invention relates to data transmission systems and more specifically to methods and apparatus for effecting the direct transmission in real time of coded signals representing handwritten alpahbetical letters and Arabic numerals.

Teletypewriter systems have been known and extensively used for many years to communicate alphabetical and numerical information between locations in a communication system. These systems, although performing satisfactorily their intended purpose, have certain shortcomings and disadvantages. For example, due to the physical size and weight of conventional teletypewriter transmitters, such equipment may not readily be moved from location to location and accordingly its use has primarily been restricted to fixed installations. Further, the requirement for special transmission channels reserved for teletypewriter systems has placed additional restrictions upon the mobility of this equipment. An additional disadvantage of present teletypewriter systems is that operates with special training are required to operate teletypewriter transmitters. A still further disadvantage of conventional teletypewriter transmission equipment is a result of the complexity of the electrical circuits and mechanical apparatus therein. This increases the initial cost and the cost of maintenance of such equipment.

Objects of the present invention are to provide an improved transmitter for transmitting alphabetical letters and Arabic numerals to conventional teletypewriter receiving and printing equipment which, because of its small size and light weight, is readily portable, which requires very little special training to operate, and which is inexpensive to fabricate and maintain.

A copending application of T. L. Dimond, Serial No. 678,213, filed on August 14, 1957, now Patent No. 3,108,-254, issued October 22, 1963, discloses a real time reader which reads and automatically translates into machine readable coded signals, alphabetical letters and Arabic numerals written by hand while the characters are being written. In the above-cited T. L. Dimond application the Arabic numerals are hand described about two guide dots on a platen containing a plurality of electrically conductive segments utilizing an electrically conductive stylus. The particular Arabic numerals hand described in this manner are determined by detecting which of the segments are traversed by the stylus in describing the characters. As the segments are contacted by the electrically conductive stylus, coded signals are produced representing the described numeral. The above-cited copending application of T. L. Dimond also discloses a similar arrangement for translating handwritten alphabetical letters. However, in this instance four guide dots are utilized as constraints for the hand describing of the alphabetical letters. Coded signals representing the particular alphabetical letters hand described on the four-dot platen are produced and thus provide machine language representing the alphabetical letters. The real time reader disclosed in the T. L. Dimond application provides a substantial advancement in the art. However, because a different method of constraint is utilized to translate hand- written Arabic numerals and alpabetical letters, the writer must become familiar with both methods of constraint. As a consequence, the efficiency and the facility with which both Arabic numerals and alphabetical letters are read and translated in real time is not as great as desired. Furthermore, the degree of constriction imposed upon the writer in the formation of alphabetical letters about four guide dots, as disclosed in the above-identified T. L. Dimond application, is not conducive to speed and efficiency and care must be exercised in forming the letters to prevent errors in translation.

It is another object of this invention to provide an improved real time reader and translator for both handwritten Arabic numerals and alphabetical letters.

It is a further object of this invention to reduce the constraint placed upon the writer of alphabetical letters and Arabic numerals when translating such handwritten characters in real time into machine language.

Further objects of the present invention are to increase the speed and reliability of the real time translation into machine language of handwritten alphabetical letters and Arabic numerals.

These and other objects of the present invention are attained in a specific embodiment thereof wherein the size, shape and orientation of handwritten Arabic numerals and alphabetical letters are controlled so as to advantageously be adapted for automatic translation in real time into coded signals. Unlike the method of constraint imposed upon the writer disclosed in the above-identified copending application of T. L. Dimond where Arabic numerals are written about two guide dots in a defined writing area and alphabetical letters are written about four guide dots in a defined writing area, in accordance with the present invention both alphabetical letters and Arabic numerals (hereinafter referred to as alpha-numeric characters) are written about two guide dots in a defined writing area. Thus only a single method of constraint need be learned by the writer. Furthermore, the constriction imposed upon the writer in the formation of the characters is reduced to the extent that no unnatural or abnormal restrictions are imposed upon the writer in the formation of the characters.

The automatic translation into coded signals representing the alpha-numeric characters hand written about two guide dots, in accordance with the present invention, is accomplished not only by detecting which of a plurality of criterion areas in the difined writing area are traversed when the characters are written as disclosed in the above-identified T. L. Dimond application but additionally by determining the sequence in which particular criterion areas are traversed and the number of traversals of particular criterion areas. Thus, in accordance with the present invention, a reduction of the constriction imposed upon the writer and a simplification in the formation of alpha-numeric characters are attained by taking advantage of the sequential characteristics involved in the act of writing the characters. For example, the letter O is drawn by the majority of writers in a counterclockwise direction whereas the curved portion of the letter D is drawn in a clockwise direction. Accordingly, the sequence of criterion areas traversed when the curved portion of the letter D is written will be opposite to the sequence of criterion areas traversed when the letter O is written. In accordance with the present invention, this difference in sequence is advantageously utilized to distinguish the letter O from the letter D when both are written about two guide dots in a defined writing area.

In accordance with another aspect of the present invention, an alpha-numeric transmitter adapted for the two-dot method of constraint described above is utilized to transmit coded signals representing handwritten alphanumeric characters over a voice communications channel to effect the control of a teletypewriter printer. The receiving, translating and printing equipment utilized in the combination of this aspect of the invention may advantageously be associated with any telephone subscriber's line. After a connection to this subscriber's line from a calling subscriber's telephone line has been established through any of the telephone switching systems known in the art, the alpha-numeric transmitter of the present invention is connected to the calling subscriber's line. The alpha-numeric transmitter will then transmit a distinctive pair of audio frequency signals over the established connection for each of the criterion areas in the defined writing area thereof that are contacted or traversed as the characters are described by hand thereon. At the receiving end of the established connection, the signals are received, identified and translated into teletypewriter permutation coded signals for each of the characters. These permutation coded signals then control the operation of a teletypewriter printer to print the characters. Thus a message may be transmitted to a teletypewriter printer located at a telephone subscriber's home or place of business from any telephone instrument.

It is a feature of the present invention that the hand writing of both alphabetical letters and Arabic numerals be controlled by a single two-dot method of constraint to adapt the letters and numerals for automatic real time translation into distinctive coded signals.

It is a further feature of the present invention that the sequence of criterion areas traversed when alpha-numeric characters are hand written in a defined writing area be utilized to distinctly identify the characters.

It is another feature of the present invention that the number of traversals of particular criterion areas in a defined writing area be utilized to distinctly identify alpha-numeric characters described by hand therein.

It is an additional feature of the present invention that distinctive coded signals representing hand-written alpha-numeric characters be transmitted over a voice communications channel to effect the control of a teletypewriter printer.

The foregoing and other objects and features of the present invention will be more readily understood from the following description of an illustrative embodiment thereof when read with reference to the accompanying drawing in which:

FIG. 3 is a table showing the combination of criterion areas in the defined writing area of FIG. 1 which are traversed when each of the Arabic numerals and alphabetical letters are hand written in the manner shown in FIG. 2;

FIG. 4 is a simplified block diagram of an illustrative embodiment of the data transmission system of the present invention;

FIG. 5 depicts in schematic form an illustrative embodiment of the real time alpha-numeric transmitter of the present invention;

FIG. 6 depicts in simplified schematic form one illustrative manner in which the audio frequency signals from the alpha-numeric transmitter of FIG. 5 may be applied to a transmission line;

FIG. 7 depicts in simplified schematic form another illustrative manner in which the audio frequency signals from the alpha-numeric transmitter of FIG. 5 may be applied to a transmission line;

FIG. 12 depicts in schematic diagram form an illustrative embodiment of the letters-numbers discriminator circuit of the present invention;

FIG. 14 shows the manner in which FIGS. 5 through 13 may be arranged to provide a detailed schematic representation of an illustrative embodiment of the present invention.

*General Description*

Figure 1:
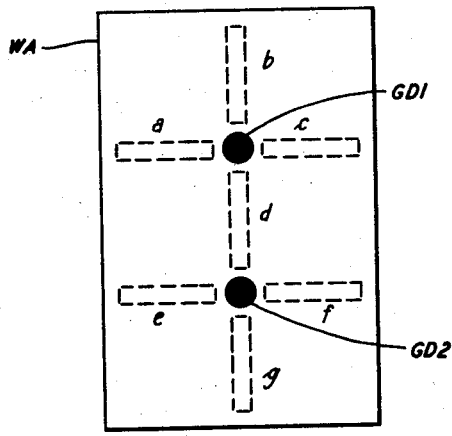
FIG. 1 depicts an illustrative embodiment of a defined writing area for the hand writing of both alpha-betical letters and Arabic numerals in accordance with the present invention.
Figure 2:
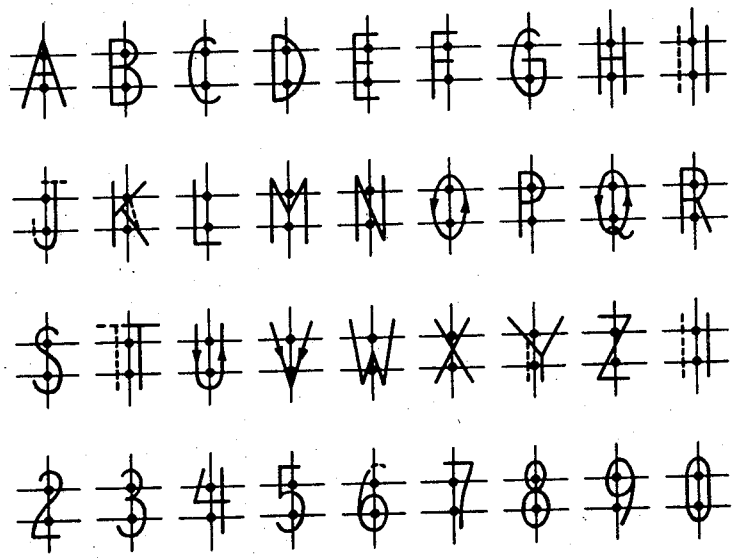
FIG. 2 shows an illustrative manner in which both alphabetical letters and Arabic numerals are hand written in the defined writing area of FIG. 1.

Turning now to the drawing, FIGS. 1, 2 and 3 depict one illustrative embodiment of the manner, in accordance with the present invention, in which the hand writing of alpha-numeric characters may be controlled to adapt the handwritten characters for translation in real time into distinctive coded signals. FIG. 1 shows an enlargement of a defined writing area WA in which each of the individual alpha-numeric characters may advantageously be written. Within defined writing area WA are located two visible guide dots GD1 and GD2 and disposed about guide dots GD1 and GD2 are a plurality of criterion areas designated $a$ through $g$. In accordance with the present invention, the writer is instructed to form the alpha-numeric characters about guide dots GD1 and GD2 in defined writing area WA in the manner shown in FIG. 2. FIG. 3 is a table showing each of the alpha-numeric characters with the combination of the criterion areas $a$ through $g$ traversed thereby when hand written in defined writing area WA.

It will be observed, referring to FIGS. 2 and 3, that when the letter A, for example, is hand drawn about guide dots GD1 and GD2 in defined writing area WA, criterion areas $b$, $a$, $e$, $c$, $f$ and $d$, will be traversed. It will also be noted, referring to FIGS. 2 and 3, that when the letter R is drawn by hand in a defined writing area WA in the manner shown in FIG. 2 the same combination of criterion areas will be traversed. In accordance with the present invention, the ambiguity resulting from the traversal of the same combination of criterion areas when the letters A and R are hand drawn in defined writing area WA is resolved by taking advantage of the sequential characteristics involved in writing the two letters. It will be noted that when the letter A is drawn, criterion area $c$ is traversed, and is followed by traversal of criterion area $f$ with the traversal of no other criterion area interposed. This results because the righthand side of the letter A is drawn in a single stroke. When the righthand side of the letter R is drawn, the traversal of criterion area $c$ will be followed by a traversal of criterion area $d$ and then a traversal of criterion area $f$. Thus the traversal of criterion area $d$ interposed between the traversal of criterion area $c$ and criterion area $f$ distinguishes the letter R from the letter A and enables the ambiguity in the combination of traversed criterion areas shown in the table of FIG. 3 for the letters A and R to be resolved.

The ambiguity between the letter B and the numeral 8, the letter O and the numeral zero (hereinafter written as $\emptyset$ to distinguish from the letter O), the letter I and the numeral 1, the letter S and the numeral 5, the letter T and the numeral 7, the letter Y and the numeral 4, the letter Z and the numeral 2, shown in the table of FIG. 3, is resolved, in accordance with the present invention, by the presence of a "shift" signal as is common in the teletypewriter art to distinguish alphabetical letters and Arabic numerals. Thus, no distinctive resolution of these ambiguities is required because a "Letters" signal will precede and identify each combination of traversed criterion areas for alphabetical letters and a "Numbers" signal will precede and identify each combination of traversed criterion areas for Arabic numerals.

The ambiguity shown in the table of FIG. 3 for the letters D, O and Q is resolved, in accordance with the present invention, by taking advantage of the sequential characteristics of the act of writing these letters. The majority of writers draw the letters O and Q in a counter-clockwise direction and the curved portion of the letter D in a clockwise direction. Thus, when the letters O or Q are hand drawn on defined writing area WA, criterion area $f$ will be traversed prior to the traversal of criterion area $c$. On the other hand, when the letter D is hand drawn on defined writing area WA, criterion area $c$ will be traversed prior to the traversal of criterion area $f$. The difference in sequence in traversing criterion areas $f$ and $c$ enables the ambiguity in the combination of criterion areas traversed shown in the table of FIG. 3 for the letters D, O and Q to be resolved. The letter Q is distinguishable from the letter O by its tail which traverses criterion area $g$ a second time and, in accordance with the present invention, the ambiguity between O and Q is resolved by determining the number of traversals of criterion area $g$ made when the letters are hand drawn.

The ambiguity in the group of letters H, K, M, N, W, and X, shown in the table of FIG. 3, which all traverse the same combination of criterion areas when drawn by hand in a defined writing area WA in the manner shown in FIG. 2, is resolved, in accordance with the present invention, by determining the sequence of traversal of the criterion areas and/or the number of traversals of particular criterion areas. All of the letters of this group except X have a vertical stroke on the left, that is, in the writing of all of these letters except the letter X the traversal of criterion area $a$ is followed by the traversal of criterion area $e$ without the traversal of another criterion area interposed. Accordingly, this distinguishes the letter X of this group from the letters H, K, M, N, and W. Of this group of ambiguous letters it will be noted that only the letter W traverses criterion area $e$ twice, and accordingly this will uniquely identify the letter W. Similarly, the letter M is the only letter of this ambiguous group which traverses criterion area $c$ twice, and this fact uniquely identifies the letter M. The letter N of this group is uniquely identified by a single traversal of criterion area $e$ and a double traversal of criterion area $f$. Furthermore, of this group of ambiguous letters the letter H is the only one which traverses criterion area $d$ last and accordingly this uniquely identifies the letter H. The letter K of this ambiguous group is uniquely identified by the fact that when it is drawn in defined writing area WA in the manner shown in FIG. 2 the left-hand portion of the K is a vertical stroke and criterion area $a$ and $e$ are traversed without the traversal of another criterion area interposed. This fact, plus the fact that criterion areas $c$ and $f$ are each traversed only a single time and a traversal of criterion area $d$ is followed by the traversal of criterion area $f$, uniquely identifies the letter K, as no other letter in this group of ambiguous letters meets these conditions.

Referring again to the table of FIG. 3, it will be noted that when the letters U and V are drawn in defined writing area WA, the combination of criterion areas traversed is identical. This ambiguity is resolved, in accordance with the present invention, by noting the sequence of traversal of the criterion areas. If the letter U is drawn in one continuous sweep and the letter V is made in two separate strokes, criterion area $f$ will be traversed prior to criterion area $c$ for the letter U, and criterion area $c$ will be traversed prior to the traversal of criterion area $f$ for the letter V. In this manner the letters U and V are distinguished.

As shown in FIG. 2, considerable latitude is permissible in the formation of the characters. For example, the letter I may be drawn either to the right or left of guide dots GD1 and GD2. Similarly, the numeral 1 may be drawn on either side of the guide dots. The vertical stroke for the letter T and the letter Y may likewise be drawn on either side of the guide dots. The letter J may be drawn with or without a horizontal stroke at the top and may or may not extend to traverse criterion area $e$. Other options are shown in the table of FIG. 3 and are indicated by the "dash" marks. Thus the letter I may be uniquely identified by the traversal of criterion area $e$ or $f$ whether or not the vertical strokes thereof extend and traverse criterion areas $a$ or $c$ respectively.

Turning now to FIG. 4 of the drawing, the operation of an illustrative embodiment of a data transmission system in accordance with the present invention will first be described in a general way. Following this general description a more detailed description will be given with reference to FIGS. 5 through 13 of the drawing.

As shown in FIG. 4 of the drawing, the data transmission system of the present invention comprises an alpha-numeric transmitter indicated generally as 101 which includes a writing platen PL and a multifrequency oscillator OSC, and data receiving equipment indicated generally as 102 which includes a multifrequency receiver MFR, a translator TRL and a teletypewriter printer PR. In accordance with an aspect of the present invention, transmitter 101 and receiving equipment 102 may advantageously be interconnected by telephone lines through a telephone switching system. As shown in FIG. 4, telephone subscriber's set 104 where the transmitting equipment 101 is located is connected via telephone line TL1 to switching equipment 103 and telephone set 105 where the receiving equipment 102 is located is connected via telephone line TL2 to switching equipment 103.

A voice transmission path is established from telephone set 104 to telephone set 105 through switching equipment 103 in the usual manner by either dialing the directory number assigned to telephone set 105 or by establishing a connection through a manual switchboard. After this transmission path has been established over lines TL1 and TL2, switching device SW1 at telephone set 104 is operated to connect the transmitter 101 to line TL1. As will be described hereinafter, a signal is transmitted from transmitter 101 over lines TL1 and TL2 to cause the operation of switching device SW2 at telephone set 105 which will disconnect telephone set 105 from line TL2 and connect the receiving equipment 102 to line TL2. It is to be understood that switching device SW1 is illustrative only of one way in which transmitting equipment 101 may be connected to line TL1. As will be described hereinafter, transmitter 101 may advantageously be connected to an audio transducer which may be held or clamped to the conventional transmitter of telephone set 104 and thus acoustically couple transmitter 101 to telephone line TL1.

Platen PL of transmitter 101 shown in FIG. 4 is advantageously constructed of nonconducting material and contains a defined writing area of the type shown in FIG. 1 wherein the criterion areas of FIG. 1 are defined by electrically conductive segments embedded in the surface of the defined writing area. Alpha-numeric characters are described by hand on the nonconductive surface of platen PL in the defined writing area, in the manner shown in FIG. 2 of the drawing, with an electrically conductive stylus. Associated with writing platen PL and electrically connected thereto is oscillator OSC of transmitter 101 which advantageously applies a distinctive pair of audio tones to telephone line TL1 for each of the electrically conductive segments contacted by the electrically conductive stylus as the alpha-numeric characters are described on platen PL. Each distinctive pair of multifrequency audio tones applied to line TL1 is in turn transmitted through the switching equipment 103 over line TL2 and applied to a multifrequency receiver MFR in receiving equipment 102. Multifrequency receiver MFR may be of any type well known in the art which in response to the pairs of distinctive multifrequency tones selectively applies signal potentials to a plurality of leads connected to translator TRL.

Translator TRL advantageously includes logic, memory and counting circuits which, in accordance with the present invention determine from the signal potentials selectively applied thereto by multifrequency receiver MFR the identity of the electrically conductive segments in platen PL contacted by the writing stylus as the alpha-numeric characters are described by hand thereon, the sequence in which particular ones of these segments are contacted, and the number of times particular ones of these segments are contacted. From this information translator TRL uniquely identifies the alpha-numeric characters drawn by hand on platen PL and translates these characters into teletypewriter permutation code signals to control teletypewriter printer PR. Teletypewriter printer PR prints each alpha-numeric character described by hand on platen PL as each character is written. Thus, in accordance with the present invention, the receiving equipment 102 may be permanently associated with a telephone line such as telephone line TL2, and the transmitting equipment 101, which is small and readily portable, may advantageously be carried from location to location and coupled to any telephone line. After a connection is established to the telephone set 105 where the receiving equipment 102 is located in the usual manner either by dialing or through a manual switchboard, transmitting equipment 101 may be coupled to the line and alpha-numeric information transmitted to receiving equipment 102 for printing on teletypewriter printer PR.

*Explanation of Circuit Components and Conventions*

In the detailed description of the illustrative embodiment of the present invention given hereinafter, circuit components and logic circuits known in the art have been depicted in block schematic form in the drawing to simplify both the drawing and the description. Prior to this detailed description, therefore, a general discussion of these components will be given.

Figure 9:
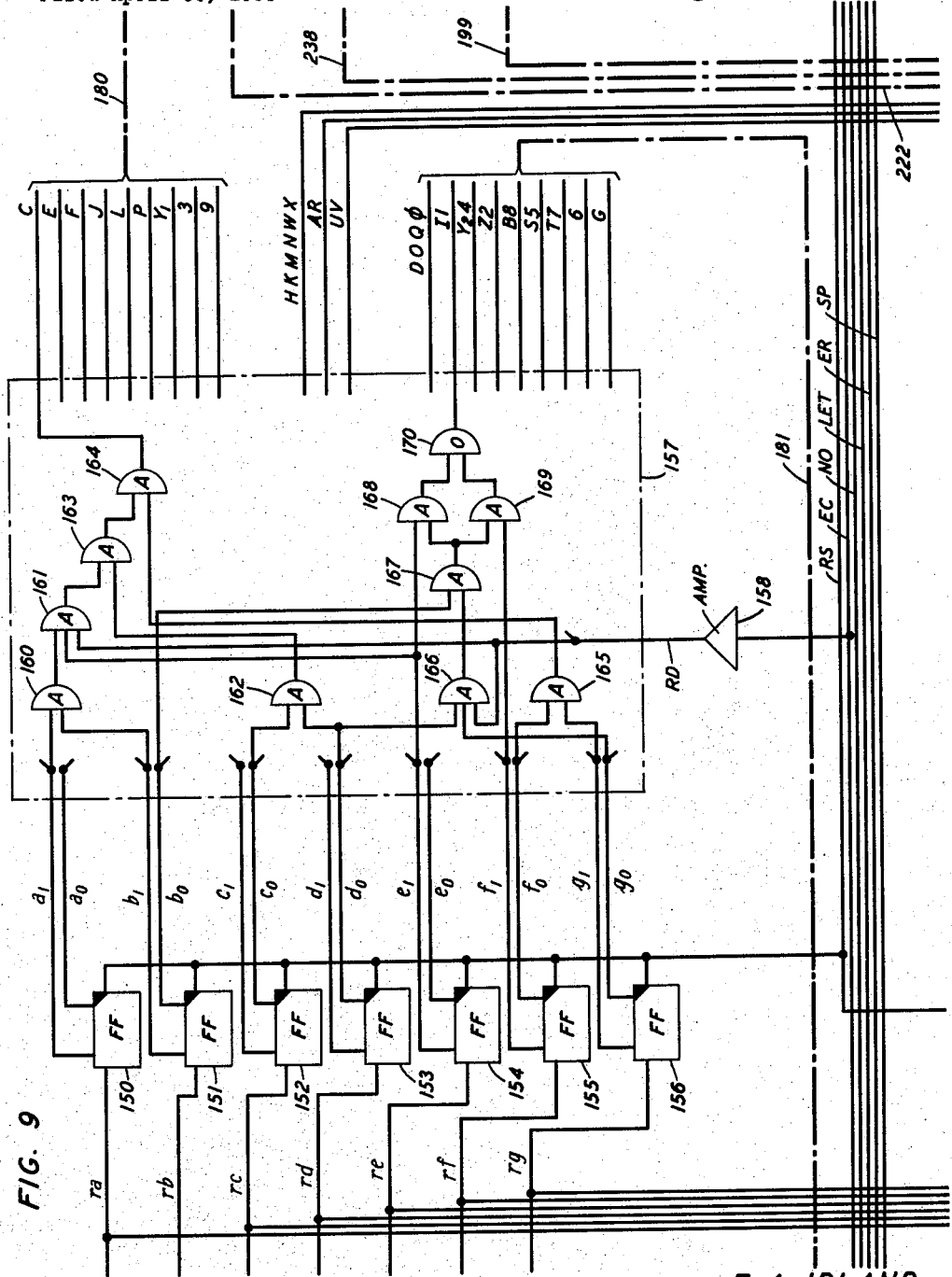
FIG. 9 depicts in schematic diagram form an illustrative embodiment of the segment-to-symbol translator of the present invention.

The memory function in the illustrative embodiment of the present invention is performed by flip-flop circuits which are well known in the art. Each of these flip-flops is designated "FF" in the block diagram representation and each has two outputs, one designated the "0" output lead and one designated the "1" output lead. The shaded corner of the block diagram flip-flop representation indicates the normally conducting stage. Referring to FIG. 9, for example, when flip-flop 150 is normal the $a_0$ output lead will have a negative signal potential applied thereto. When a negative signal potential is applied over input lead $ra$ to operate flip-flop 150, the normally conducting stage will be cut-off and the other stage will conduct and result in the application of a negative signal potential to the $a_1$ lead.

Two basic types of diode logic "building blocks" used extensively in the illustrative embodiment of the present invention are the AND gate and the OR gate which are well known in the art. OR gates are identified by the letter "O" and AND gates are identified by the letter "A" in the block diagram representation. In the illustrative embodiment of the present invention these gates respond to negative signal potentials.

The counting function is performed in the illustrative embodiment of the present invention by binary counters also well known in the art. Each of these binary counters is designated "BC" in the block diagram representation. The binary counters may advantageously utilize circuits similar to that of the flip-flops with the addition of a diode steering network added in one of the many possible configurations known in the art for counting operation. The shaded corner in the binary counter block diagram representation used herein indicates the normally conducting stage when the counter is reset by a signal voltage applied to its reset lead.

The block diagram representation of the illustrative embodiment of the present invention shown in FIGS. 5 through 13 of the drawing when arranged as shown in FIG. 14 is skeletonized in that amplifiers and impedance matching devices not necessary to the understanding of the operation of the circuits are not illustrated. Amplifiers and impedance matching devices as required may be connected in the circuits in a manner known in the art.

*Detailed Description Alpha-Numeric Transmitter*

FIG. 5 of the drawing shows one illustrative embodiment of a real time alpha-numeric transmitter in accordance with the present invention by which multifrequency audio tones representing handwritten alpha-numeric characters may advantageously be transmitted over a transmission line to control the printing of the alpha-numeric characters on a conventional teletypewriter printer. As shown in FIG. 5, this embodiment comprises a platen PL constructed of any suitable insulating material upon which a defined writing area WA is located. Defined writing area WA on platen PL shown in FIG. 5 is similar to the defined writing area illustrated in FIG. 1 of the drawing and contains two guide dots GD1 and GD2 about which alpha-numeric characters are written in the two-dot system of constraint described hereinbefore. The criterion areas designated $a$ through $g$ shown in FIG. 1 of the drawing are defined in writing area WA on platen PL of FIG. 5 by electrically conductive segments designated $sa$ through $sg$. Segments $sa$ through $sg$ are embedded in the surface of platen PL within defined writing area WA as shown and each corresponds to a respective criterion area $a$ through $g$ shown in FIG. 1 of the drawing.

In the manner described hereinbefore, alpha-numeric characters are written about guide dots GD1 and GD2 in defined writing area WA on platen PL of FIG. 5 in the manner shown in FIG. 2 with an electrically conductive stylus STY connected via a flexible conductor WL to a source of ground potential. As each of the alpha-numeric characters is described in defined writing area WA on the platen PL of FIG. 5, stylus STY will contact successive ones of electrically conductive segments $sa$ through $sg$. For example, when the alphabetical letter A is hand drawn in defined writing area WA on platen PL of FIG. 5, electrically conductive segments $sa$, $se$, $sb$, $sc$, $sf$ and $sd$, are contacted by stylus STY. Referring to the table of FIG. 3, the combination of traversed criterion areas shown therein when the various alpha-numeric characters are described by hand about guide dots GD1 and GD2 in defined writing area WA shown in FIG. 1 also corresponds to the combination of conductive segments $sa$ through $sg$ contacted when stylus STY is utilized to describe the alpha-numeric characters in defined writing area WA on the platen PL of FIG. 5.

In addition to the conductive segments $sa$ through $sg$ embedded within defined writing area WA on platen PL, a start segment designated START and a stop segment designated STOP are also embedded in the platen PL as shown in FIG. 5. The START segment and the STOP segment are covered by an insulated slide designated 111 which is slidably attached to platen PL in any suitable manner. Slide 111 associated with the START segment and the STOP segment form a start-stop slide switch which may be activated by stylus STY. When stylus STY is used to move slide 111 to the righthand position as shown in FIG. 5, stylus STY will contact the START segment. When stylus STY is used to move slide 111 to the lefthand position, the stylus will contact the STOP segment.

Two additional conductive segments are embedded in platen PL and are designated NO for numbers and LET for letters. These two segments are covered by an insulated slide 112 which is slidably attached to platen PL and form a numbers-letters slide switch which may also be activated by stylus STY. When stylus STY is utilized to move slide 112 to its lefthand position as shown in FIG. 5 the stylus will contact the letters segment LET. Similarly, when stylus STY is used to move the slide 112 to its righthand position, the stylus will contact the numbers segment NO.

Three additional electrically conductive segments designated ERASE, EC and SPACE are also embedded in the surface of platen PL shown in FIG. 5. Each alpha-numeric character hand drawn on platen PL of FIG. 5 is followed by an end-of-character signal to indicate that the character has been completely drawn. This is accomplished, in accordance with the present invention, by contacting stylus STY to the end-of-character segment designated EC. In the event that an error is made in describing an alpha-numeric character on platen PL, this error may be corrected or eliminated by contacting stylus STY to the ERASE segment prior to end-of-character signal as will be described hereinafter. The segment designated SPACE on platen PL is utilized, in the manner to be described, to transmit a signal to the receiving equipment to control the teletypewriter printer to provide for word spacing.

The illustrative embodiment of the alpha-numeric transmitter shown in FIG. 5 utilizes two oscillators designated OSC1 and OCS2 for transmitting a selected pair of audio frequency tones from the customary multifrequency group 700, 900, 1100, 1300, 1500 and 1700 cycles per second over a communications line to the receiving equipment for each of the conductive segments in platen PL which are contacted by stylus STY when the alpha-numeric characters are described by hand thereon. Each of these oscillators utilizes five tuning capacitors which are connected individually to provide five frequencies of operation for each oscillator. Both oscillators function at four identical resonant frequencies, namely 900, 1100, 1300 and 1500 cycles per second. Each oscillator is capable of operating at one additional frequency, 700 and 1700 cycles per second, respectively.

As shown in FIG. 5, the tuned circuit of oscillator OSC1 comprises inductance LL1 and a selected one of capacitors 1C7, 1C9, 1C11, 1C13 and 1C15. Similarly, the tuned circuit of oscillator OSC2 comprises inductance LL2 and a selected one of the capacitors 2C9, 2C11, 2C13, 2C15 and 2C17. Each oscillator utilizes the five tuning capacitors which are connected individually to provide five frequencies of operation for each unit. This arrangement allows, through suitable switching, fifteen distinct pairs of frequencies to be generated. The particular frequency generated by each of the oscillators OSC1 and OSC2 depends upon which of the conductive segments in platen PL is contacted by stylus STY.

As shown in FIG. 5, each of the conductive segments in platen PL is connected to one OR gate in each of two groups of OR gates associated with oscillators OSC1 and OSC2, respectively. For example, start segment START is connected via lead STT to OR gate 115 in the group of OR gates 113 through 117 associated with oscillator OSC1 and to OR gate 122 in the group of OR gates 118 through 122 associated with oscillator OSC2. Similarly, conductive segment sc, for example, is connected by lead tc to OR gate 114 associated with oscillator OSC1 and OR gate 119 associated with oscillator OSC2. In a similar manner, each of the conductive segments on platen PL is connected to one OR gate in each of the two groups of OR gates associated with the respective oscillators OSC1 and OSC2.

The following table shows an illustrative coding arrangement for the transmission of two out of six possible frequencies of the group 700, 900, 1100, 1300, 1500 and 1700 cycles per second to the receiving equipment for each of the segments embedded in platen PL which are contacted or traversed by stylus STY.

| Segment on Platen PL: | Frequency transmitted |
|---|---|
| START | 1100–1700 |
| STOP | 1500–1700 |
| EC | 1300–1700 |
| ERASE | 1100–1500 |
| SPACE | 900–1700 |
| NO | 900–1500 |
| LET | 1300–1500 |
| sa | 700–900 |
| sb | 700–1100 |
| sc | 900–1100 |
| sd | 700–1300 |
| se | 900–1300 |
| sf | 1100–1300 |
| sg | 700–1500 |

Referring to FIG. 5, it will be noted that when stylus STY contacts segment sb in platen PL, ground potential is applied via lead WL, conductive stylus STY, segment sb, conductor tb, to an input of OR gate 113 and an input of OR gate 119. The actuation of OR gate 113 will complete the circuit to ground over the path above established through condenser 1C7 and oscillator OSC1 will oscillate at a resonant frequency of 700 cycles per second. Similarly, the actuation of OR gate 119 will complete a circuit to ground for capacitor 2C11 and oscillator OSC2 will oscillate at a resonant frequency of 1100 cycles per second. Thus, in accordance with the table given above, the two frequencies transmitted when stylus STY contacts segment sb are 700 and 1100 cycles per second. The two audio frequencies supplied by oscillator OSC1 and OSC2 are applied via leads 123 and 124 respectively to the input of power-mixing amplifier PMA. Here the two frequency signals are mixed and increased in power before being applied to the transmission line, as will be described hereinafter. In a similar fashion, two of the six frequencies given in the table above for each of the segments are applied to power-mixing amplifier PMA when stylus STY contacts the respective segments in platen PL.

The pairs of audio frequency tones from the output of power-mixing amplifier PMA shown in FIG. 5 may advantageously be applied to a transmission line in any one of a number of ways. FIG. 6 shows one illustrative method of applying the output of power-mixing amplifier PMA to line TL1. As shown in FIG. 6, the amplified and mixed output of power-mixing amplifier PMA shown in FIG. 5 is applied to line TL1 through transformer TR1 and the contacts of switch SW1. After a connection has been established from telephone set 104 through switching equipment 103, as described hereinbefore, switch SW1 may be operated which will disconnect telephone set 104 from line TL1 and connect the output winding of transformer TR1 thereto.

FIG. 7 shows an alternative method of applying the output of power-mixing amplifier PMA shown in FIG. 5 to line TL1. In this embodiment the mixed and amplified audio tones from the output of power-mixing amplifier PMA are applied to a transducer TRA. After a connection has been established from telephone set 104 through switching equipment 103 to the receiving equipment, in the manner described hereinbefore, transmitter TRA may be held or clamped to the transmitter TR of telephone set 104. In this manner the pairs of audio frequency tones from the output of power-mixing amplifier PMA shown in FIG. 5 are acoustically coupled through the telephone set transmitter TR to line TL1.

*Multifrequency Receiver*

Figure 8:
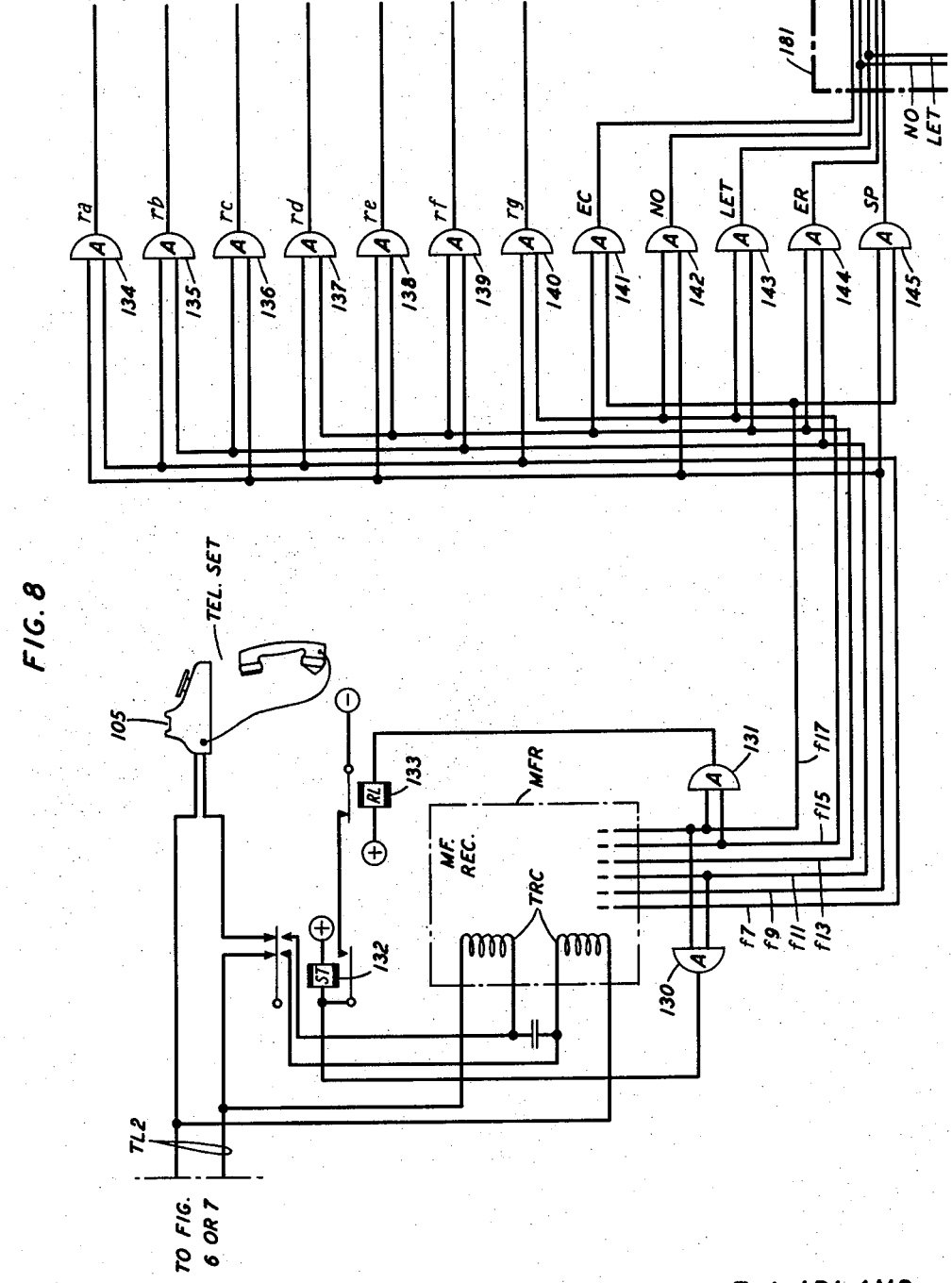
FIG. 8 depicts in block diagram form an illustrative embodiment of the multifrequency receiver and pretranslator of the present invention.

The receiving equipment of the illustrative embodiment of the present invention is disclosed in FIGS. 8 through 13. The pairs of multifrequency tones applied to line TL1 by the alpha-numeric transmitter of the present invention shown in FIG. 5 are transmitted over line TL1 through switching equipment 103 shown in FIG. 6 or 7 and applied over line TL2 to a multifrequency receiver MFR connected to line TL2 at the location of telephone set 105 as shown in FIG. 8. Because the multifrequency receiver MFR has no protection against signal imitation by speech, it is disabled when telephone set 105 is being used for a normal conversation. After a connection between telephone set 104 shown in FIG. 6 or 7 and telephone set 105 shown in FIG. 8 has been established through switching equipment 103 as described hereinbefore and the alpha-numeric transmitter of the present invention shown in FIG. 5 has been connected to line TL1 in the manner shown in FIG. 6 or 7 as described hereinbefore, stylus STY is utilized to actuate the start-stop slide switch on platen PL to the start position as shown in FIG. 5. In doing so, stylus STY will contact the START segment in platen PL and, referring to the table given hereinbefore, a pair of audio frequency tones of 1100 and 1700 cycles per second will be transmitted over lines TL1 and TL2 to the receiving equipment.

Multifrequency receiver MFR shown in block form in FIG. 8 may be any of the multifrequency receivers well known in the art which in response to multifrequency signals selectively apply signal potentials to output leads therefrom. As is well known, these multifrequency receivers comprise band pass filters, rectifiers, gas tubes and other circuit elements, which detect the particular ones of multifrequency signals received thereby and apply signal potentials to particular ones of its output leads. A typical multifrequency receiver which may be advantageously be utilized in the illustrative embodiment of the present invention is disclosed in the copending application of W. V. K. Large—R. O. Soffell—B. J. Yokelson, Serial No. 284,622, filed April 26, 1952, now Patent No. 2,826,638. Multifrequency receiver MFR in the illustrative embodiment of the present invention operates to detect the particular multifrequency signals in the group 700, 900, 1100, 1300, 1500 and 1700 cycles per second received over line TL2 and to apply negative signal potentials to the respective output leads *f7, f9, f11, f13, f15* and *f17*.

When a start signal comprising two audio frequency tones of 1100 and 1700 cycles per second is received over line TL2, multifrequency receiver MFR will be enabled and apply a negative signal potential to output leads *f11* and *f17*. These negative signal potentials are combined in AND gate 130 shown in FIG. 8 which in turn will cause the operation of ST relay 132. The operation of ST relay 132 disconnects telephone set 105 from line TL2 and closes a path which may be traced from the upper conductor of line TL2, through the lower winding of transformer TRC, through the make contacts of ST relay 132, through the upper winding of transformer TRC, to the lower conductor of telephone line TL2. Thus ST relay 132 in operating maintains a direct-current path across telephone line TL2 to hold the switching equipment 103 shown in FIG. 6 or 7 in an operated condition and disconnects telephone set 105 from line TL2. ST relay 132 in operating locks-operated through the back contact of RL relay 133.

After the transmission of the alpha-numeric information to the receiving equipment has been completed, stylus STY is utilized in the manner described hereinbefore to actuate the start-stop slide switch on platen PL shown in FIG. 5 to the stop position. When stylus STY contacts the STOP segment of platen PL a pair of audio tones having frequencies of 1500 and 1700 cycles per second are transmitted over lines TL1 and TL2 and applied to multifrequency receiver MFR. Multifrequency receiver MFR will in turn apply a negative signal potential to leads *f15* and *f17*. These negative signal potentials are combined in AND gate 131 shown in FIG. 8 which will in turn cause the operation of RL relay 133. The operation of RL relay 133 opens the holding path for ST relay 132 and permits ST relay 132 to release.

The release of ST relay 132 reconnects telephone set 105 to line TL2 and removes the direct-current voltage holding path from line TL2. This will permit switching equipment 103 shown in FIG. 6 or 7 to release the connection between telephone sets 104 and 105 over lines TL1 and TL2. RL relay 133 will restore to normal after a short interval and the circuits associated with multifrequency receiver MFR are then normal and in condition for receiving another call.

After telephone set 105 has been disconnected from line TL2 as described above, each of the conductive segments on platen PL of FIG. 5 contacted by stylus STY as the alpha-numeric characters are described thereon will cause the transmission in the manner described hereinbefore of a pair of audio frequency tones over lines TL1 and TL2 to multifrequency receiver MFR. Multifrequency receiver MFR will apply negative signal potentials to respective pairs of leads *f7, f9, f11, f13, f15* and *f17* corresponding to the pairs of audio frequency tones received.

*Pretranslator*

The output leads *f7* through *f17* from multifrequency receiver MFR are utilized in the manner described hereinbelow to identify the particular conductive segment on platen PL contacted by stylus STY. These output leads are applied to a plurality of AND gates designated 134 through 145 as shown in FIG. 8 which comprise what may be termed a pretranslator. The output leads from these AND gates designated *ra* through *rg*, EC, NO, LET, ER and SP, correspond to the respective conductive segments on platen PL of FIG. 5. Negative signal potentials are selectively applied to the input leads *f7* through *f17* to these AND gates by multifrequency receiver MFR to provide a translation between the audio tones received by MF receiver and the particular conductive segment contacted by stylus STY.

For example, when stylus STY contacts conductive segment *sd* in the platen PL of FIG. 5, oscillators OSC1 and OSC2 of FIG. 5 will apply audio tones whose frequencies are 700 and 1300 cycles per second respectively. When these signals are received by multifrequency receiver MFR, a negative signal potential will be applied to leads *f7* and *f13* respectively. The negative signal potentials on leads *f7* and *f13* are combined in AND gate 137 shown in FIG. 8 to apply a negative signal potential on the output lead *rd*. In a similar manner, negative signal potentials will be applied to the respective output leads from AND gates 134 through 145 shown in FIG. 8 which correspond to the conductive segments in platen PL of FIG. 5 contacted by stylus STY.

*Segment-to-Symbol Translator*

The output leads *ra* through *rg* from AND gates 134 through 140 shown in FIG. 8 which correspond to conductive segments *sa* through *sg* respectively of platen PL, are applied to a segment-to-symbol translator shown in FIG. 9. This translator comprises a plurality of flip-flops designated 150 through 156 and a logic translator within the box designated 157. The function of the segment-to-symbol translator of FIG. 9 is to translate the combinations of segments contacted by stylus STY when the alpha-numeric characters are hand drawn on platen PL of FIG. 5 into individual letters and numbers where the combinations are unique or into groups of letters and numbers where the combinations are ambiguous.

As indicated hereinbefore, the table of FIG. 3 shows the various combinations of criterion areas traversed when alpha-numeric characters are hand described in a defined writing area WA of the type shown in FIG. 1. The same combination of conductive segments *sa* through *sg* in the defined writing area WA on platen PL of FIG. 5 will be contacted by stylus STY when the alpha-numeric characters are hand drawn thereon, and accordingly the table of FIG. 3 shows the combinations of segments contacted when the alpha-numeric characters are hand drawn on platen PL of FIG. 5. The table of FIG. 3 in effect is a truth table for logic translator 157 shown in FIG. 9.

The segment signals are received from the pretranslator comprising AND gates 134 through 145 of FIG. 8 in serial form. The negative signal potentials applied to leads $ra$ through $rg$ cause the operation of flip-flops 150 through 156 corresponding to the segments crossed. Each flip-flop has at its output a "segment crossed" or "1" lead and a "segment not crossed" or "0" lead. For example, when a negative signal potential is applied to the $ra$ lead indicating that segment $sa$ on platen PL of FIG. 5 has been contacted by stylus STY, flip-flop 150 will be set and a negative signal potential will be applied to its $a_1$ output lead. Similarly, when negative signal potentials are successively and selectively applied to the remaining leads $rb$ through $rg$ indicating that the corresponding conductive segments $sb$ through $sg$ of platen PL of FIG. 5 have been contacted by stylus STY, the corresponding flip-flops 151 through 156 respectively will be set.

Thus, for example, when the letter C is hand described on platen PL of FIG. 5, conductive segments $sb$, $sa$, $se$, and $sg$ will be contacted by stylus STY in this order. Multifrequency receiver MFR shown in FIG. 8, in response to the distinctive pairs of audio frequency tones received over line TL2 identifying these particular segments, will in turn cause negative signal potentials to be applied through the OR gates 135, 134, 138 and 140 to leads $rb$, $ra$, $re$ and $rg$ respectively. The negative signal potentials on these leads will in turn cause flip-flops 151, 150, 154 and 156 in the segment-to-symbol translator of FIG. 9 to be operated to their set condition, and under this assumed example flip-flops 152, 153 and 155 will remain normal. Thus, as each of the segments $sa$ through $sg$ of platen PL of FIG. 5 are contacted by stylus STY as the alpha-numeric characters are described thereon, the respective flip-flops 150 through 156 in FIG. 9 will be set to their operated condition.

The "segments crossed" output leads $a_1$ through $g_1$ and the "segments not crossed" output leads $a_0$ through $g_0$ from flip-flops 150 through 156 shown in FIG. 9 are translated by AND and OR logic gates in logic translator 157 in accordance with the truth table shown in FIG. 3 of the drawing. To simplify the drawing and the description, only two illustrative examples of these translations are shown in detail in FIG. 9. The translations in accordance with the table of FIG. 3 for the letter C and for the letter I and numeral 1 are shown in detail. It is to be understood that AND and OR logic gates are used in a similar manner in accordance with the truth table of FIG. 3 to perform the translation for all of the alpha-numeric characters.

Because the segment-to-symbol translation must not be performed until the alpha-numeric characters hand described on the platen of FIG. 5 have been completed, the logic translator 157 is not enabled until an end-of-character signal is received. When this signal is received a negative signal potential is applied to the EC lead from the output of AND gate 141 shown in FIG. 8 and is applied to the input of amplifier 158 shown in FIG. 9. Amplifier 158 in turn applies a negative signal potential to the RD read-out lead in logic translator 157.

Referring to FIG. 3, it will be noted that when the letter C is hand described on platen PL of FIG. 5, conductive segments $sb$, $sa$, $se$ and $sg$ will be contacted by stylus STY. The contacting of these segments in this order will in turn cause the operation in the manner described above of flip-flops 151, 150, 154 and 156, the remaining flip-flops shown in FIG. 9 being normal. Logic translator 157 operates in accordance with the truth table of FIG. 3 to translate the negative signal potentials on the $a_1$, $b_1$, $c_0$, $d_0$, $e_1$, $f_0$ and $g_1$ leads. The negative signal potentials on the $a_1$ and $b_1$ leads are combined in AND gate 160 which in turn applies a negative signal potential to the upper input of AND gate 161. The negative signal potential on the $e_1$ lead is applied to the center input of AND gate 161, and AND gate 161 is actuated by the negative signal potential on the RD lead. The negative signal potentials on the $c_0$ and $d_0$ leads are combined in AND gate 162 which in turn applies a negative signal potential to the lower input of AND gate 163. This negative signal potential is combined with the negative signal potential from the output of AND gate 161 to apply a negative signal potential to the upper input of AND gate 164. The negative signal potentials on the $f_0$ and $g_1$ leads are combined in AND gate 165 which in turn applies a negative signal potential to the lower input of AND gate 164. The actuation of AND gate 164 in turn applies a negative signal potential to the C lead. In this manner the segments contacted by stylus STY are translated in logic translator 157 to provide a negative signal potential on the output lead C from logic translator 157.

The AND and OR gates in logic translator 157 perform the translation shown in the truth table of FIG. 3 and advantageously recognize some of the more common differences in the formation of characters. For example, the letters I, T and Y may be drawn with the vertical stroke on either side of guide dots GD1 and GD2 on platen PL of FIG. 5, the letter J may be drawn with or without the horizontal stroke at the top, and the numeral 6 may be drawn with or without the top curled across conductive segment $sb$ on the platen PL of FIG. 5.

Referring to the table of FIG. 3, it will be noted that the letter I and the numeral 1 may be drawn either to the right or left of guide dots GD1 and GD2. If drawn to the right this combination may be distinctly identified when stylus STY contacts conductive segment $sf$. When drawn to the left of guide dots GD1 and GD2, this combination may be distinctly identified when stylus STY contacts conductive segment $se$. As shown in the table of FIG. 3, there are a number of segments indicated by a dash mark in which the translation for the letter I and the numeral 1 may be accomplished without reference to these segments, and these segments are therefore indicated as the "don't care" segments. For example, in the combination for the letter I and numeral 1 the conductive segments $sa$ and $sc$ are not used in the translation.

Logic translator 157 makes a segment-to-symbol translation for the letter I and the numeral 1 combination by combining the negative signal potential applied to the $d_0$ and $g_0$ leads with the negative signal potential on the RD lead in AND gate 166. The actuation of AND gate 166 in turn applies a negative signal potential to the lower input of AND gate 167. The upper input of AND gate 167 is connected to the $b_0$ lead and the negative signal potential thereon will cause the actuation of AND gate 167 which in turn will apply negative signal potentials to one input of each of AND gates 168 and 169. The upper input of AND gate 168 is connected to the $e_1$ lead, and if the letter I or numeral 1 combination has been drawn to the left of guide dots GD1 and GD2 AND gate 168 will be actuated by the negative signal potential on the $e_1$ lead which in turn will cause the actuation of OR gate 170 which will apply a negative signal potential to the I1 lead. On the other hand, if the letter I or numeral 1 has been drawn to the right of guide dots GD1 and GD2 on platen PL the negative signal potential on the $f_1$ lead will cause the actuation of AND gate 169 and this in turn will actuate OR gate 170 and apply a negative signal potential to the I1 lead.

As indicated hereinbefore and as will be observed by referring to the table of FIG. 3, the translation performed by logic translator 157 does not uniquely identify all alpha-numeric characters. The output leads for the alpha-numeric characters which are uniquely identified by logic translator 157 are grouped in cable 180 which as shown in FIG. 9 are the output leads for the letters C, E, F, J, L, P, one option for Y, and the numerals 3 and 9. These leads extend via cable 180 to the letters-numbers combining circuit shown in FIG. 10.

As will be described later herein, after the alphanumeric character described on platen PL of FIG. 5 has been printed by the teletype writer printer equipment shown in FIG. 11, a negative signal potential is applied over the reset lead RS which will reset flip-flops 150 through 156 shown in FIG. 9 to normal in preparation for translating the next combination of conductive segments.

Letters-Numbers Discriminator

The ambiguities existing between letters and numbers at the output of logic translator 157 shown in FIG. 9 are resolved in the letters-numbers discriminator shown in FIG. 12 of the drawing. As shown in the table of FIG. 3, there is ambiguity between the letters DOQ and numeral Ø, the letter I and numeral 1, the letter Z and numeral 2, the letter S and numeral 5, the letter T and numeral 7, the letter B and numeral 8, and the one option of the letter Y and numeral 4. The output leads for these segment combinations from logic translator 157 are applied via cable 181 to the letters-numbers discriminator of FIG. 12. As shown in FIG. 12, the letters-numbers discriminator comprises a plurality of AND gates designated 182 through 197 and a flip-flop designated 198. Flip-flop 198 is triggered to its "1" state by a negative signal potential on the numbers lead NO from the output and AND gate 142 shown in FIG. 8 and is reset to its "0" state by a negative signal potential on the letters lead LET from the output of AND gate 143 shown in FIG. 8. As indicated hereinbefore, the writer must operate the numbers-letters slide switch shown on the platen of FIG. 5 to the numbers position when Arabic numerals are to be transmitted and to the letters position when alphabetical letters are to be transmitted. In the numbers position flip-flop 198 shown in FIG. 12 will be operated to its "1" state and will apply a negative signal potential to the DNO lead. When the numbers-letters slide switch on platen PL of FIG. 5 is operated to the letters position, flip-flop 198 will be set in its "0" state and will apply a negative signal potential to the DLET lead. The input leads via cable 181 from the logic translator 157 of FIG. 9 are applied to respective ones of AND gates 182 through 197. For example, the S5 lead is connected to one input of AND gate 187 and one input of AND gate 186. If flip-flop 198 is set to its numbers position, the negative signal present on the DNO lead will be combined with a negative signal potential present on the S5 lead in AND gate 186 and will in turn apply a negative signal potential to the 5 lead which extends in cable 199 to the letters-numbers combining circuit shown in FIG. 10. Similarly, with flip-flop 198 set in its letters position a negative signal potential on the S5 lead will be combined with the negative signal potential on the DLET lead in AND gate 187 which in turn will cause a negative signal potential to be applied to the S lead in cable 199 to the letters-numbers combining circuit shown in FIG. 10. It will be noted that in each of the leads of cable 181 there is ambiguity between letters and numbers, and this ambiguity is resolved in the letters-numbers discriminator of FIG. 12. The output leads from AND gates 182 through 196 are applied as indicated above over cable 199 to the letters-numbers combining circuit of FIG. 10. The output lead designated DOQ from AND gate 197 is applied to the letters resolution circuits of FIG. 13.

Letters Resolution Circuits

Figure 13:
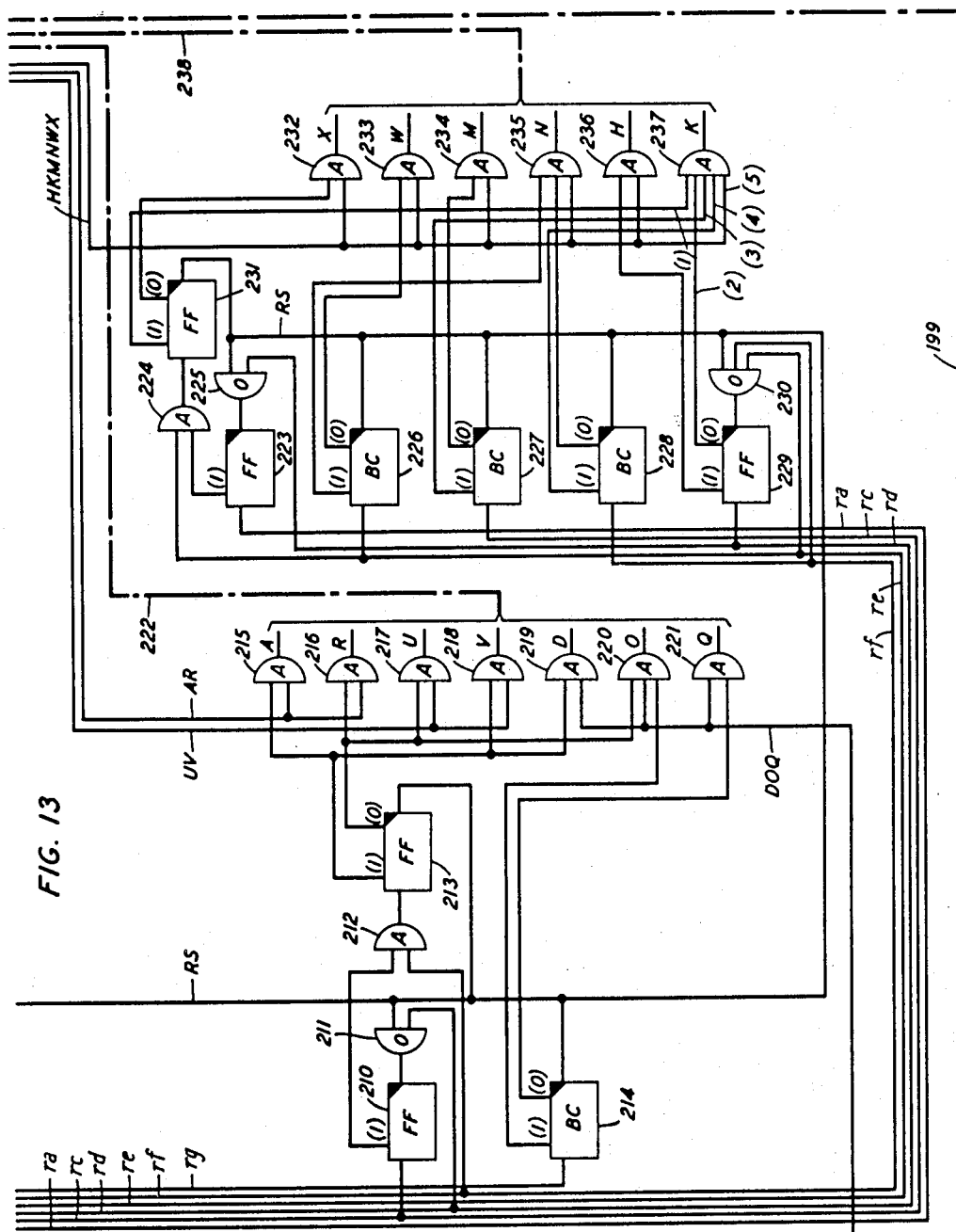
FIG. 13 depicts in schematic diagram form an illustrative embodiment of the letters resolution circuits of the present invention.

The ambiguities between letters at the output of logic translator 157 shown in FIG. 9, and the ambiguity between the letters DOQ at the output of AND gate 197 shown in FIG. 12, are resolved in the letters resolution circuits shown in FIG. 13. As shown in the table of FIG. 3, there is ambiguity in the group of letters H, K, M, N, W and X, there is ambiguity between the letters U and V, between the letters A and R, and between the letters D, O and Q. The output leads for these segment combinations from logic translator 157 are applied over individual leads designated HKMNWX, AR, UV, from logic translator 157 and over the DOQ lead from AND gate 197 shown in FIG. 12 to the letters resolution circuits of FIG. 13.

As indicated hereinbefore, the letter A may be distinguished from the letter R, in accordance with the present invention, by noting the sequence of conductive segments contacted by stylus STY when these letters are hand described on the platen PL of FIG. 5. When the letter A is described on platen PL of FIG. 5, conductive segment $sc$ is contacted before conductive segment $sf$ with no other segment being contacted therebetween. Similarly, when the letter R is hand described on platen PL conductive segment $sd$ will be contacted between the contacting of conductive segments $sc$ and $sf$.

Referring to FIG. 13, it will be observed that certain of the segment leads from the output of AND gates 134 through 140 shown in FIG. 8 are multipled to the letters resolution circuits of FIG. 13. When the letter A is hand drawn on the platen PL of FIG. 5, the negative signal potential applied to the $rc$ lead from the output of AND gate 136 shown in FIG. 8 will cause flip-flop 210 in FIG. 13 to be operated to its set condition. When in this condition flip-flop 210 will apply a negative signal potential from its "1" output lead to the upper input of AND gate 212. When conductive segment $sf$ is contacted by stylus STY, the negative signal potential on the segment lead $rf$ from the output of AND gate 139 shown in FIG. 8 will be applied to the lower input of AND gate 212. The actuation of AND gate 212 will in turn apply a negative signal potential to flip-flop 213 which will cause it to be set to its "1" condition. The setting of flip-flop 213 to its "1" condition will apply a negative signal potential from its "1" output lead to the upper input of AND gate 215 shown in FIG. 13. The negative signal potential at the upper input of AND gate 215 from the output of flip-flop 213 is combined with a negative signal potential on the AR lead from the output of logic translator 157 to cause a negative signal potential to be applied to the A lead which extends via cable 222 to the letters-numbers combining circuit of FIG. 10.

When the letter R is hand drawn on platen PL of FIG. 5, a negative signal potential will be applied to the $rc$ lead from the output of AND gate 136 of FIG. 8 when stylus STY contacts conductive segment $sc$. This will cause flip-flop 210 shown in FIG. 13 to be operated to its "1" condition. Subsequently, when stylus STY contacts conductive segment $sd$, the negative signal potential on the $rd$ lead from the output of AND gate 137 of FIG. 8 is applied to OR gate 211 shown in FIG. 15 which in turn will cause flip-flop 210 to be reset. When conductive segment $sf$ is contacted by stylus STY and a negative signal potential is applied to the $rf$ lead, AND gate 212 will not be actuated because the upper input connected to the "1" output of flip-flop 210 will inhibit AND gate 212 and flip-flop 213 will remain in its unset or normal condition. As shown in FIG. 13, when flip-flop 213 is normal a negative signal potential from its "0" output is applied to the upper input of AND gate 216. This negative signal potential will be combined in AND gate 216 with a negative signal potential on the AR lead to provide a negative signal potential on the R output lead which extends via cable 222 to the letters-numbers combining circuit of FIG. 10. Thus, flip-flops 210 and 213 permit the ambiguous combination of conductive segments traversed for the letters A and R to be resolved.

Similarly, the ambiguity between the letters U and V from the output of logic translator 157 is resolved by determining the difference in sequence of contacting conductive segments $sc$ and $sf$ on platen PL with stylus STY. When the righthand portion of the letter V is described on platen PL with a single downward stroke, conductive segment $sc$ is contacted before conductive segment $sf$. The negative signal potential on the rc lead will cause flip-flop 210 to be operated and apply a negative signal potential to the upper input of AND gate 212. When segment sf is contacted the negative signal potential on the rf lead will cause the actuation of AND gate 212 which in turn will cause flip-flop 213 to be operated to its set condition. Flip-flop 213 when operated to its set condition will apply a negative signal potential from its "1" output lead to the upper input of AND gate 218. This negative signal potential is combined in AND gate 218 with a negative signal potential on the UV lead from logic translator 157 to provide a negative signal on the output lead V extending via cable 222 to the letters-numbers combining circuit of FIG. 10.

When the letter U is described on platen PL in a continuous stroke as described hereinbefore, conductive segment sf is contacted prior to conductive segment sc. In this event flip-flop 213 will not be operated and will apply a negative signal potential from its "0" output lead to the upper input of AND gate 217. This negative signal potential is combined in AND gate 217 with a negative signal potential on the UV lead to apply a negative signal potential over the U output lead which extends via cable 222 to the letters-numbers combining circuit of FIG. 10.

As indicated hereinbefore, the letters O, Q and D are distinguished in a similar manner by noting the sequence of traversal of conductive segments sc and sf on platen PL. When the letter O or Q is described on platen PL, flip-flop 213 of FIG. 13 will be normal and a negative signal potential will be applied from its "0" output to the upper input of AND gate 220. The center input of AND gate 220 is connected to the DOQ lead while the lower input of AND gate 220 is connected to the "1" output of binary counter 214. If conductive segment sg on platen PL is contacted but a single time, binary counter 214 will be operated only a count of one and accordingly will apply a negative signal potential from its "1" output lead to the lower input of AND gate 220. The actuation of AND gate 220 will in turn apply a negative signal potential over the 0 output lead in cable 222 to the letters-numbers combining circuit of FIG. 10.

When the letter D is described on platen PL in the manner indicated hereinbefore, flip-flop 213 will be operated to its set condition and apply a negative signal potential to the upper input of AND gate 219 shown in FIG. 13. The actuation of AND gate 219 in response to a negative signal potential over the DOQ lead will in turn apply a negative signal potential over the D output lead in cable 222 which extends to the letters-numbers combining circuit of FIG. 10.

The letter Q and letter O are distinguished, in accordance with the present invention, by the contacting of segment sg a second time when the tail of the Q is described. When segment sg is contacted the first time, binary counter 214 shown in FIG. 13 is operated to a count of 1. When segment sg is contacted the second time when the tail of the Q is drawn, binary counter 214 is reset back to its normal position and will apply a negative signal potential over its "0" output lead to the lower input of AND gate 221. The actuation of AND gate 221, in response to a negative signal potential over the DOQ lead from the output of AND gate 197, will in turn apply a negative signal potential over the output lead Q extending in cable 222 to the letters-numbers combining circuit of FIG. 10.

In a similar manner, the ambiguities in the group of letters H, K, M, N, W and X are resolved by the letters resolution circuits of FIG. 13. As indicated hereinbefore, the letter X of this group may be distinguished from the remaining letters of the group because it is the only letter which does not have a vertical stroke on its lefthand side. Flip-flops 223 and 231 shown in FIG. 13 serve to indicate the presence of a lefthand vertical stroke by recognizing the contacting of segment sa followed by the contacting of segment se without the contacting of segment sd interposed. When each of the letters H, K, M, N, and W, are hand described on platen PL of FIG. 5, conductive segment sa will be contacted by stylus STY and the negative signal potential applied to the ra lead will cause flip-flop 223 to be triggered to its set condition. When flip-flop 223 is in its set condition, a negative signal potential will be applied from its "1" output to the lower input of AND gate 224. When conductive segment se on platen PL of FIG. 5 is contacted, the negative signal potential applied to the re lead is applied to the upper input of AND gate 224. The actuation of AND gate 224 will in turn cause the operation of flip-flop 231 to its set condition. The letter X is the only letter of this ambiguous combination in which the contacting of conductive segment sa is not immediately followed by a contacting of conductive segment se. Accordingly, when the letter X has been written, flip-flop 223 will be operated but AND gate 224 will not be actuated and flip-flop 231 will remain normal. With flip-flop 231 normal a negative signal voltage is applied from its "0" output lead to the upper input of AND gate 232. When a negative signal voltage is applied over the HKMNWX lead from logic translator 157, AND gate 232 will be actuated and apply a negative signal potential over the X output lead which extends in cable 238 to the letters-numbers combining circuit of FIG. 10.

As indicated hereinbefore, the letter W of this group of ambiguous letters is the only letter which, when described by hand on platen PL of FIG. 5, will contact conductive segment se twice. The first time that conductive segment se is contacted, the negative signal potential on the re lead will cause the operation of binary counter 226 shown in FIG. 13. The second time conductive segment se is contacted, binary counter 226 will be returned to its normal condition and will apply a negative signal potential over its "0" output lead to the upper input of AND gate 233. Accordingly, when a negative signal potential is applied to the HKMNWX lead from logic translator 157, AND gate 233 will be actuated to apply a negative signal potential over the W output lead which extends in cable 238 to the letters-numbers combining circuit of FIG. 10.

Similarly, the letter M is the only letter of this ambiguous group which, when described by hand on platen PL of FIG. 5 will contact conductive segment sc twice. The first time conductive segment sc is contacted by stylus STY, the negative signal potentital applied to the rc lead will cause the operation of binary counter 227 to the count of 1. The second time that conductive segment sc is contacted, the negative signal potential on the rc lead will return binary counter 227 to its normal condition indicating a count of 2 and a negative signal potential will be applied from the "0" output lead of binary counter 227 to the upper input of AND gate 234. AND gate 234 will be actuated when a negative signal potential is applied to the HKMNWX lead from the output of logic translator 157, and will in turn apply a negative signal potential to the M output lead extending in cable 238 to the letters-numbers combining circuit of FIG. 10.

As indicated hereinbefore, the letter N of this group is the only letter in which the conductive segment se is contacted but a single time and the conductive segment sf is contacted twice. When conductive segment se is contacted by stylus STY, the negative signal potential applied to the re lead will cause the operation of binary counter 226 to indicate a count of 1. Binary counter 226 will apply a negative signal potential from its "1" output lead to the upper input of AND gate 235. When the conductive segment sf is contacted the first time by stylus STY, the negative signal potential applied to the rf lead will cause the operation of binary counter 228 to indicate a count of 1, and when it is contacted a second time binary counter 228 will be returned to normal to indicate a count of 2. Binary counter 228, indicating a count of 2, will apply a negative signal potential from its "0" output to the center input of AND gate 235. AND gate 235 will be actuated when a negative signal potential is present on the HKMNWX lead from the output of logic translator 157, and will in turn apply a negative signal potential to the N output lead extending in cable 238 to the letters-numbers combining circuit of FIG. 10.

As indicated hereinbefore, the letter H of this ambiguous group of letters is the only one which contacts conductive segment $sd$ last, and accordingly when stylus STY contacts conductive segment $sd$ on platen PL of FIG. 5 the negative signal potential applied to the $rd$ lead will cause the operation of flip-flop 229 to its set state. In this state flip-flop 229 will apply a negative signal potential from its "1" output lead to the upper input of AND gate 236. It will be noted that if the contacting of conductive segment $sd$ is followed by the contacting of conductive segments $sf$ or $se$, a negative signal potential will be applied via leads $rf$ or $re$, respectively, to OR gate 230 which in turn will reset flip-flop 229 to its normal state. With flip-flop 229 set as indicated above, AND gate 236 will be actuated when a negative signal potential is applied to the HKMNWX lead. The actuation of AND gate 236 will in turn apply a negative signal potential over the H lead extending in cable 238 to the letters-numbers combining circuit of FIG. 10.

The last letter, the letter K of this group of ambiguous letters, as indicated hereinbefore, may be uniquely identified by the fact that when it is described on platen PL of FIG. 5 the lefthand portion of the letter is a vertical stroke and conductive segments $sa$ and $se$ are contacted without the contacting of another segment interposed, the fact that conductive segments $sc$ and $sf$ are each contacted a single time and that the contacting of conductive segment $sd$ is followed by the contacting of conductive segment $sf$. When conductive segment $sa$ is contacted the negative signal potential on the $ra$ lead shown in FIG. 13 will cause the setting of flip-flop 223 to its set state. This will apply a negative signal potential from the "1" output of flip-flop 223 to the lower input of AND gate 224. When conductive segment $se$ is contacted the negative signal potential on the $re$ lead applied to the upper input of AND gate 224 will cause the actuation of AND gate 224 which in turn will apply a negative signal potential to flip-flop 231. The operation of flip-flop 231 to its set state will apply a negative signal potential from its "1" output lead to the (1) input of AND gate 237. When conductive segment sc is contacted the negative signal potential on the $rc$ lead will operate binary counter 227 to indicate a count of 1. A negative signal potential will be applied from the "1" output of binary counter 227 to the (3) input of AND gate 237. When conductive segment $sd$ is contacted the negative signal potential on the $rd$ lead is applied to flip-flop 229 and will cause this flip-flop to be operated to its set condition. The negative signal potential on the $rd$ lead is also applied to the lower input of OR gate 225 which when actuated will reset flip-flop 223 to its normal condition. When conductive segment $sf$ is contacted the negative signal potential on the $rf$ lead is applied through OR gate 230 to reset flip-flop 229 to its normal condition. With flip-flop 229 in its normal condition a negative signal potential is applied from its "0" output lead to input (2) of AND gate 237. The negative signal potential on the $rf$ lead is also applied to binary counter 228 and causes this counter to be operated to indicate a count of 1. With binary counter 228 in this condition a negative signal potential is applied from its "1" output lead to the (4) input of AND gate 237. Thus, with negative signal potentials applied to the (1), (2), (3), (4) inputs of AND gate 237, this AND gate will be actuated when a negative signal potential is applied over the HKMNWX lead from the output of logic translator 157 shown in FIG. 8 to the (5) input of AND gate 237. The actuation of AND gate 237 will in turn apply a negative signal potential over the K output lead extending in cable 238 to the letters-numbers combining circuit of FIG. 10.

As will be described later herein, after the alphanumeric character described on platen PL of FIG. 5 has been printed by the teletypewriter printer equipment shown in FIG. 11, a negative signal potential is applied over the reset lead RS which will reset all of the flip-flops and binary counters shown in FIG. 13 to their normal condition in preparation for the translation of succeeding alpha-numeric characters.

Letters-Numbers Combining Circuit

Figure 10:
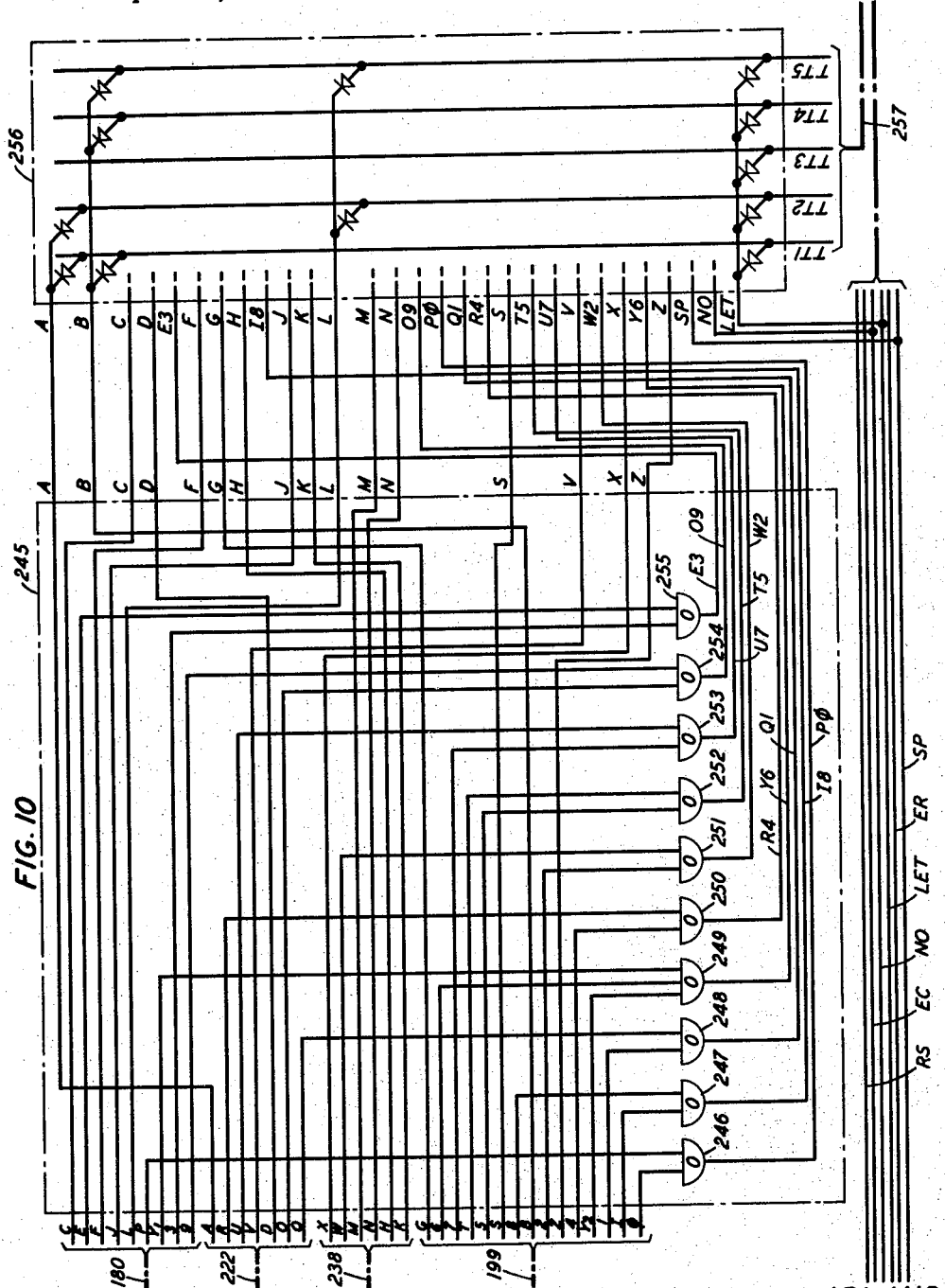
FIG. 10 depicts in schematic form an illustrative embodiment of the letters-numbers combining circuits and the teletypewriter translator circuit of the present invention.

The output leads in cable 180 from the logic translator 157 shown in FIG. 8, the output leads in cable 199 from the letters-numbers discriminator circuit of FIG. 12, and the output leads in cables 222 and 238 from the letters resolution circuits of FIG. 13, are applied to a letters-numbers combining circuit 245 shown in FIG. 10. The Arabic numerals 0 through 9 are upper case characters on conventional teletypewriter printers and have the same teletypewriter code as corresponding lower case letters. Therefore, each of the numerals 0 through 9 must be combined with its corresponding letters before translation into a teletypewriter code is accomplished. The letters-numbers combining circuit 245 shown in FIG. 10 comprises a plurality of OR gates designated 246 through 255. As shown in FIG. 10, the P input lead in cable 180, for example, is combined with the $\phi$ input lead in cable 199 in OR gate 246 and provides a P$\phi$ output lead which is applied to the teletypewriter translator 256. The combining of Arabic numeral leads and the corresponding alphabetical leads are performed by the other OR gates 247 through 255 as shown. It will be noted that OR gate 249 in FIG. 10 has three inputs, one input connected to the numeral 6 lead of cable 199, one input connected to the $Y_2$ lead of cable 199, and one input connected to the $Y_1$ lead of cable 180. In this manner both options or methods of hand describing the letter Y on the platen PL of FIG. 5 are combined with the numeral 6 to provide the Y6 output lead to teletypewriter translator 256.

Teletypewriter Translator

A teletypewriter translator 256 shown in FIG. 10 translates the negative signal potentials applied to the output leads of the letters-numbers combining circuit 245 into a teletypewriter permutation code. The output leads from the teletypewriter translator 256 are designated TT1, TT2, TT3, TT4, and TT5, and extend via cable 257 to the teletypewriter drive circuits of FIG. 11. Actually the teletypewriter translator 256 shown in FIG. 10 comprises five large OR configurations of diodes which provide negative signal potentials on respective output leads TT1 through TT5 in accordance with the incoming letter or numeral leads. Only four translations are illustrated within the teletypewriter translator 256 shown in FIG. 10. It is to be understood that other translations are accomplished in a similar manner. For example, the translation for the letter A provided by teletypewriter translator 256 will, in response to a negative signal potential applied to the A input lead, provide negative signal potentials on the TT1 and TT2 output leads. Similarly, a negative signal potential on the B input lead will provide a negative signal potential on the TT1, TT4 and TT5 output leads. The following is a table showing the translations into a typical five place teletypewriter permutation code for the incoming alphabetical and numerical leads:

| Alpha-Numeric Input Lead | Output Lead | | | | |
|---|---|---|---|---|---|
| | TT1 | TT2 | TT3 | TT4 | TT5 |
| A | X | X | | | |
| B | X | | | X | X |
| C | | | X | X | X |
| D | X | | X | | |
| E-3 | X | | | | |
| F | X | | X | X | |
| G | X | | | X | X |
| H | | | X | X | |
| I-8 | | X | X | | |
| J | X | X | | X | |
| K | X | X | X | X | |
| L | | X | | X | X |
| M | | | X | X | X |
| N | | | X | X | |
| O-9 | | | | X | X |
| P-φ | | X | X | X | |
| Q-1 | X | X | X | | X |
| R-4 | | X | | X | |
| S | X | | X | | |
| T-5 | | | | | X |
| U-7 | X | X | X | | X |
| V | | X | X | X | X |
| W-2 | X | X | | | X |
| X | X | | X | X | X |
| Y-6 | X | | X | | X |
| Z | X | | | X | |
| SPACE | | | X | | |
| NO | X | X | | X | X |
| LET | X | X | X | X | X |

Referring to FIG. 10, it will be noted that, in addition to the letter and numeral leads applied to teletypewriter translator 256, the space lead SP, the numbers lead NO, and the letters lead LET are also translated by teletypewriter translator 256. In this manner the conventional teletypewriter permutation code signals to control the spacing between words and to control the numbers-letters shift from lower to upper case are transmitted to the teletypewriter drive equipment shown in FIG. 11.

*Teletypewriter Printer and Associated Drive and Control Circuits*

The teletypewriter permutation code signals on the output leads TT1 through TT5 from teletypewriter translator 256 are in parallel form. This parallel code is converted to a serial permutation code through the teletypewriter drive and control circuits of FIG. 11. As shown in FIG. 1, these circuits include a plurality of flip-flop circuits designated 260 through 265 and a teletypewriter transmitter distributor 280. Leads TT1 through TT5 from the output of teletypewriter translator 256 of FIG. 10 are terminated respectively in flip-flops 261 through 265, and the negative signal potentials applied to these leads will in turn cause the respective flip-flops to be operated to their set condition. When one of these flip-flops is operated it will in turn apply a negative signal potential through the winding of an associated relay to a source of potential. The operation of these relays in turn will apply a ground potential over a respective one of the leads TD1 through TD5 to the code segments of transmitter distributor 280. Transmitter distributor 280 may be any of the type well known in the telegraph art and comprises five code segments plus a start segment and a stop segment. Each of the code segments 1 through 5 are connected to respective code leads TD1 through TD5. Transmitter distributor 280 further comprises a motor M connected to a source of potential and a clutch magnet 281. When clutch magnet 281 is energized motor M will rotate a brush arm 282 for one revolution. In rotating, brush arm 282 will successively connect each of the code segments to the PRT lead extending to printer PR. Printer PR may be any of the teletypewriter page printers known in the art and is advantageously arranged for automatic carriage return and line feed when the end of a line of printing is reached. As shown in FIG. 11, relays 271 through 275 are associated respectively with flip-flops 261 through 265 and when operated apply ground potentials to the respective leads TD1 through TD5.

Figure 11:
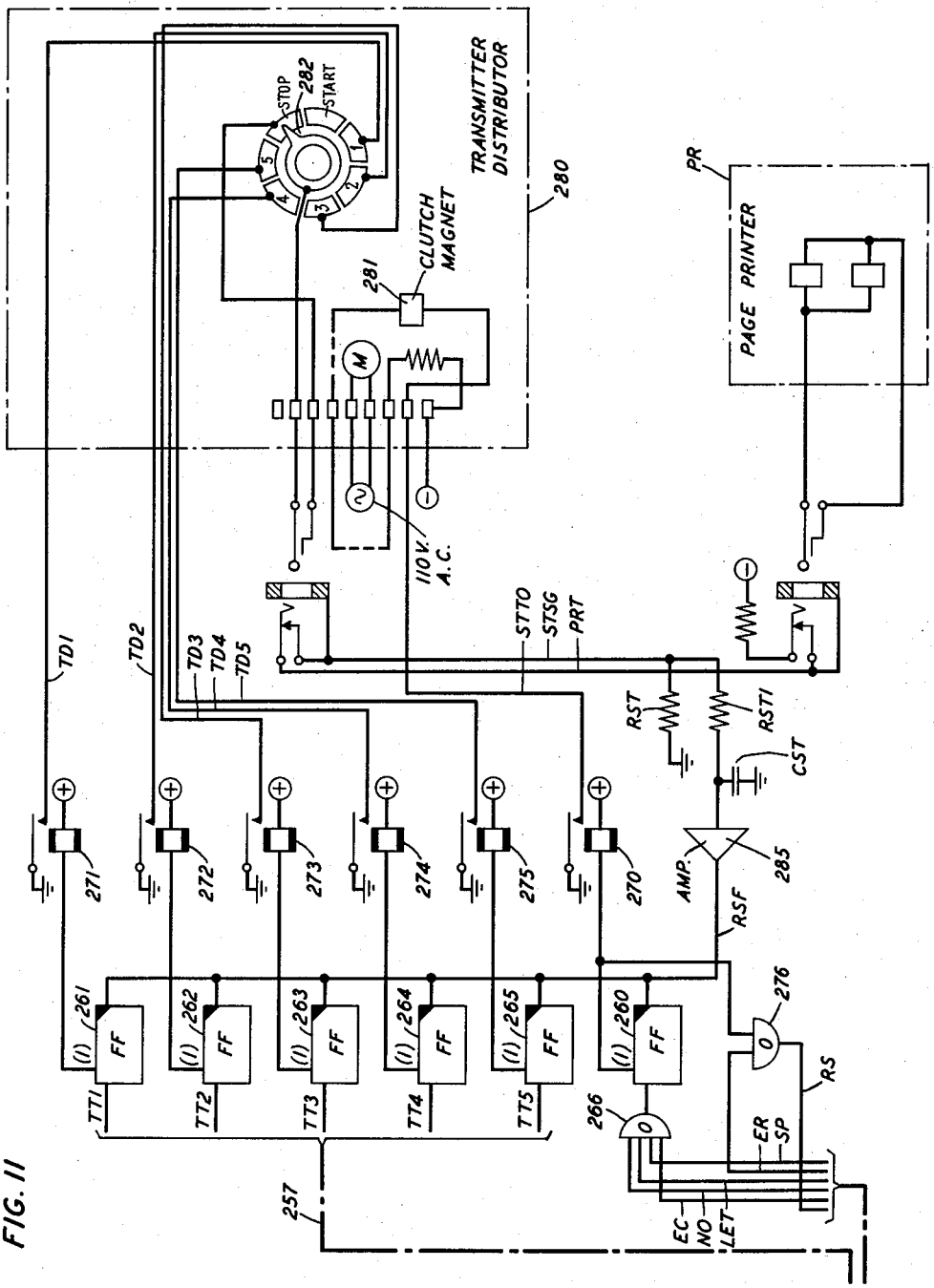
FIG. 11 depicts in simplified block diagram form an illustrative embodiment of the teletypewriter printer and associated drive and control circuits of the present invention.

Flip-flop 260 shown in FIG. 11 is associated with relay 270 and will cause the operation of this relay when operated to its set condition. Relay 270 when operated applies a ground potential to the STTO lead which extends to clutch magnet 281 in transmitter distributor 280. The energization of clutch magnet 281 in this manner controls the operation of transmitter distributor 280 through one revolution in the manner well known in the art. As the transmittor distributor 280 rotates through one revolution, mark and space signals are applied over lead PRT to teletypewriter page printer PR. Printer PR in response to these mark and space signals will print the character.

Assume, for example, that a negative signal potential has been applied to the letter A input lead to teletypewriter translator 256 of FIG. 10 and that the translation has provided, as shown in the above table, negative signal potentials on the TT1 and TT2 leads. The negative signal potentials of the TT1 and TT2 leads will cause flip-flops 261 and 262 shown in FIG. 11 to be operated to their set condition. The operation of these two flip-flops will in turn cause the operation of relays 271 and 272 which will apply ground potential over the respective leads TD1 and TD2 to segments 1 and 2 of transmitter distributor 280. When the end-of-character signal following the describing of the letter A on the platen of FIG. 5 is received, a negative signal potential on the EC lead in FIG. 11 will cause the actuation of OR gate 266. The actuation of OR gate 266 will in turn cause the operation of flip-flops 260. The operation of flip-flop 261 will in turn cause the operation of relay 270. Relay 270 in operating will apply a ground potential to the STTO lead which will energize clutch magnet 281 and engage the transmitter distributor 280 for one cycle of operation. In this manner the appropriate mark and space signals in the teletypewriter permutation code given in the above table for the letter A will be serially transmitted to printer PR which in response to these signals will print the letter A.

When flip-flop 260 operates in response to the end-of-character signal EC, a negative signal potential is also applied to the righthand input of OR gate 276 shown in FIG. 11. The actuation of OR gate 276 in response to this signal applies a negative signal potential to the RS lead which effects the resetting of the flip-flops and binary counters shown in FIGS. 9 and 13 as described hereinbefore.

After transmitter distributor 280 makes its complete revolution and the stop segment thereof is contacted, a current pulse will be drawn through resistance RST over lead STSG shown in FIG. 11. A portion of this current pulse is shunted through resistance RST1, integrated by a condenser CST and applied to amplifier 285. Amplifier 285 amplifies and shapes this current pulse and applies a negative signal voltage pulse over the RSF lead to the resetting input of flip-flops 261 through 260 thus resetting these flip-flops to normal.

The operation of the circuits above described is similar for all of the alpha-numeric characters translated by teletypewriter translator 256 shown in FIG. 10. In addition, the circuits operate in a similar manner to transmit appropriate mark and space signals in the permutation code given hereinbefore to control the shifting of printer PR from lower case to upper case characters and to control printer PR to provide a space between words. As shown in FIG. 11, one input of OR gate 266 is connected to the numbers lead NO, another input is connected to the letters lead LET, and still another input is connected to the space lead SP. Accordingly, when the numbers, letters and space signals are translated by teletypewriter translator 256 and the appropriate flip-flops 261 through 265 are operated, OR gate 266 will be actuated in the manner described hereinbefore to operate flip-flop 260 which in turn will cause the operation of the transmitter distributor.

As indicated hereinbefore, when the transmission of an alpha-numeric character has been completed and before the transmission of the end-of-character signal, the transmitted character may be erased by contacting the stylus STY on the conductive segment on the platen PL of FIG. 5 designated ERASE. The contacting of this segment will, in the manner described hereinbefore, cause a negative signal potential to be applied to the ER lead from the output of AND gate 144 shown in FIG. 8. The ER lead is connected to the left hand input of OR gate 276 shown in FIG. 11 and the negative signal potential applied thereto will cause the actuation of OR gate 276 which in turn will apply a negative signal potential to the RS lead to effect the resetting of the flip-flops and binary counters in FIGS. 9 and 13. Thus a transmitted alpha-numeric character may be erased and not printed provided that the end-of-character has not been transmitted.

The alpha-numeric transmitter disclosed in FIG. 5 of the drawing may be advantageously arranged in the manner described in the above-identified copending application of T. L. Dimond for making a written record of the alpha-numeric information transmitted over lines TL1 and TL2 to the receiving equipment shown in FIGS. 8 through 13. Thus platen PL of FIG. 5 may be arranged for transmitting apha-numeric information and at the same time making a written record thereof. As disclosed in the copending T. L. Dimond application, a sheet of writing paper may be placed over the defined writing area WA and the stylus STY may be arranged to deposit a visible trace on this paper as the alpha-numeric characters are described. By means of capacitive coupling between stylus STY and the conductive segments *sa* through *sg* in platen PL, the transmission of the audio frequency tones over the transmission line may be effected.

It is to be further understood that the defined writing area WA on platen PL of FIG. 5 is not limited to a single character but may advantageously be arranged for a plurality of defined writing areas for a word or group of words in a line.

It is also to be understood that the above-described arrangements are illustrative of the application of the principles of the present invention. Numerous other arrangements may be devised by those skilled in the art without departing from the spirit and scope of the invention.

What is claimed is:

1. A real time reader for handwritten alpha-numeric characters comprising in combination means defining a writing area for the describing thereon of both alphabetical letters and Arabic numerals, means defining a pair of guide indicia in said writing area with respect to which both said letters and said numerals are hand described, means defining a plurality of criterion areas in said writing area, a stylus for the manual describing of said letters and said numerals on said writing area, means for determining the sequences in which particular ones of said criterion areas are contacted by said stylus as said letters and said numerals are described on said writing area, and means controlled by said last-named means for identifying particular ones of said letters and said numerals described on said writing area.

2. A real time reader for handwritten alpha-numeric characters comprising in combination means defining a writing area for the describing thereon of both alphabetical letters and Arabic numerals, means defining a pair of guide indicia in said writing area with respect to which both said letters and said numerals are hand described, means defining a plurality of criterion areas in said writing area, a stylus for the manual describing of said letters and said numerals on said writing area, means for determining the number of times particular ones of said criterion areas are contacted by said stylus as said letters and said numerals are described on said writing area, and means controlled by said last-named means for identifying particular ones of said letters and said numerals described on said writing area.

3. A real time reader for handwritten alpha-numeric characters comprising in combination means defining a writing area for the describing thereon of both alphabetical letters and Arabic numerals, means defining a pair of guide indicia in said writing area with respect to which both said letters and said numerals are hand described, means defining a plurality of criterion areas in said writing area, a stylus for the manual describing of said letters and said numerals on said writing area, first means for detecting the particular ones of said criterion areas contacted by said stylus as said letters and said numerals are described on said writing area, second means for determining the sequences in which particular ones of said criterion areas are contacted by said stylus as said letters and said numerals are described on said writing area, third means for determining the number of times particular ones of said criterion areas are contacted by said stylus as said letters and said numerals are described on said writing area, and means controlled by said first means, said second means and said third means for identifying said letters and said numerals described on said writing area.

4. The combination defined in claim 3 in further combination with means controlled by said last-named means for producing coded signals representing said letters and said numerals.

5. The combination defined in claim 4 in combination with printing means controlled by said coded signals for printing said letters and said numerals.

6. The combination defined in claim 5 wherein said criterion areas comprise a plurality of conductive segments in said writing area and wherein said stylus includes an electrically conductive element having potential applied thereto.

7. The combination defined in claim 6 wherein said guide indicia comprise a pair of visible dots located in said writing area, wherein said electrically conductive segments are narrow with respect to the length thereof and wherein said segments extend radially from said guide dots in said area.

8. In a system for the transmission in real time of coded signals representing handwritten alpha-numeric information the combination comprising a nonconductive platen for the manual describing of alpha-numeric characters, a pair of visible guide dots on said platen with respect to which said characters are described, a plurality of electrically conductive segments embedded in said platen, an electrically conductive stylus for the manual describing of said characters on said platen, a multifrequency signal generator, means for controlling said generator to generate a distinctive multifrequency signal when each of said segments in said platen is contacted by said stylus as said characters are described, first means responsive to the multifrequency signals generated by said generator for determining which of said segments are contacted by said stylus, second means responsive to the multifrequency signals generated by said generator for determining the sequence in which particular ones of said segments are contacted by said stylus, and translating means controlled by said first means and said second means for identifying particular ones of said alpha-numeric characters described on said platen.

9. In a system for the transmission in real time of coded signals representing handwritten alpha-numeric information the combination comprising a nonconductive platen for the manual describing of alpha-numeric characters, a pair of visible guide dots on said platen with respect to which said characters are described, a plurality of electrically conductive segments embedded in said platen, an electrically conductive stylus for the manual describing of said characters on said platen, a multifrequency signal generator, means for controlling said generator to generate a distinctive multifrequency signal when each of said segments in said platen is contacted by said stylus as said characters are described, first means responsive to the multifrequency signals generated by said generator for determining which of said segments are contacted by said stylus, counting means responsive to the multifrequency signals generated by said generator for counting the number of times particular ones of said segments are contacted by said stylus, and translating means controlled by said first means and said counting means for identifying particular ones of said alpha-numeric characters described on said platen.

10. In a system for the transmission in real time of coded signals representing handwritten alpha-numeric information the combination comprising a nonconductive platen for the manual describing of alpha-numeric characters, a pair of visible guide dots on said platen with respect to which said characters are described, a plurality of electrically conductive segments embedded in said platen, an electrically conductive stylus for the manual describing of said characters on said platen, a multifrequency signal generator, means for controlling said generator to generate a distinctive multifrequency signal when each of said segments in said platen is contacted by said stylus as said characters are described, first means responsive to the multifrequency signals generated by said generator for determining which of said segments are contacted by said stylus, second means responsive to the multifrequency signals generated by said generator for determining the sequence in which particular ones of said segments are contacted by said stylus, counting means responsive to the multifrequency signals generated by said generator for counting the number of times particular ones of said segments are contacted by said stylus, and translating means controlled by said first means, said second means and said counting means, for identifying said alpha-numeric characters described on said platen.

11. The combination defined in claim 10 in combination with means controlled by said last-named means for producing coded signals representing said alpha-numeric characters.

12. The combination defined in claim 11 in combination with printing means controlled by said coded signals for printing said alpha-numeric characters.

13. In a system for the transmission in real time of coded signals representing handwritten alpha-numeric information the combination comprising a nonconductive platen for the manual describing of alpha-numeric characters, a pair of visible guide dots on said platen with respect to which said characters are described, a plurality of electrically conductive segments embedded in said platen, an electrically conductive stylus for the manual describing of said characters on said platen, a multifrequency audio signal generator, a multifrequency audio signal receiver having a plurality of output leads, means for establishing a transmission connection between said generator and said receiver, said receiver responsive to multifrequency audio signals received over said transmission connection to selectively apply signal potentials to said output leads, means for controlling said generator to generate a distinctive pair of audio frequency signals for each of said segments contacted by said stylus as said characters are described on said platen, first means responsive to said signal potentials applied to said output leads for determining which of said segments are contacted by said stylus, second means responsive to said signal potentials applied to said output leads for determining the sequence in which particular ones of said segments are contacted by said stylus, and a third means responsive to said signal potentials applied to said output leads for counting the number of times particular ones of said segments are contacted by said stylus, translating means controlled by said first means, said second means and said third means for identifying the alpha-numeric characters described on said platen, means controlled by said translating means for producing coded signals representing said alpha-numeric characters.

14. The combination defined in claim 13 in combination with printing means and means controlled by said coded signals representing said alpha-numeric characters for controlling said printing means to print said characters.

15. The combination defined in claim 14 wherein said means for establishing a transmission connection between said generator and said receiver includes a first telephone line having a subscriber's telephone set connected thereto, a second telephone line having a subscriber's set connected thereto, and switching means for establishing a connection between said first and said second lines.

16. The combination defined in claim 15 further comprising means for acoustically coupling said signal generator to said first telephone line.

17. The combination defined in claim 15 further comprising manually operated means for connecting said signal generator to said first telephone line and disconnecting said subscriber's telephone set therefrom.

18. The combination defined in claim 17 further comprising means responsive to a distinctive pair of audio frequency signals received by said receiver for disconnecting said telephone subscriber's set from said second telephone line.

References Cited in the file of this patent

UNITED STATES PATENTS

| | | |
|---|---|---|
| 1,311,384 | Drew | July 29, 1919 |
| 2,143,875 | Hansell | Jan. 17, 1939 |
| 2,672,605 | Taylor | Mar. 16, 1954 |
| 2,741,312 | Johnson | Apr. 10, 1956 |